United States Patent
Xue et al.

(10) Patent No.: US 12,401,421 B2
(45) Date of Patent: Aug. 26, 2025

(54) COAXIAL OPTICAL FRONT END FOR OPTICAL WIRELESS COMMUNICATION

(71) Applicant: QUALCOMM Incorporated, San Diego, CA (US)

(72) Inventors: Yisheng Xue, San Diego, CA (US); Karoly Becze, Escondido, CA (US); Xiaoxia Zhang, San Diego, CA (US); Junyi Li, Fairless Hills, PA (US); Morteza Soltani, San Diego, CA (US); Jing Sun, San Diego, CA (US); Sam Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 18/339,856

(22) Filed: Jun. 22, 2023

(65) Prior Publication Data

US 2024/0430007 A1 Dec. 26, 2024

(51) Int. Cl.
*H04B 10/112* (2013.01)
*H04B 10/40* (2013.01)

(52) U.S. Cl.
CPC .......... *H04B 10/112* (2013.01); *H04B 10/40* (2013.01)

(58) Field of Classification Search
CPC ...... H04B 10/112; H04B 10/116; H04B 10/40
USPC ....................................................... 398/118
See application file for complete search history.

(56) References Cited

U.S. PATENT DOCUMENTS

| | | | |
|---|---|---|---|
| 5,465,170 A | 11/1995 | Arimoto | |
| 2012/0248347 A1 | 10/2012 | Renna et al. | |
| 2017/0346556 A1* | 11/2017 | Tiecke | H04B 10/25 |
| 2018/0007247 A1* | 1/2018 | Aggarwal | H04B 10/116 |
| 2022/0140901 A1* | 5/2022 | Arulandu | H04B 10/11 398/118 |
| 2022/0345221 A1* | 10/2022 | Mitchell | H04B 10/1121 |

OTHER PUBLICATIONS

International Search Report and Written Opinion—PCT/US2024/029766—ISA/EPO—Sep. 12, 2024.

* cited by examiner

*Primary Examiner* — Dalzid E Singh
(74) *Attorney, Agent, or Firm* — Holland & Hart LLP

(57) ABSTRACT

Methods, systems, and devices for wireless communications are described. A user equipment (UE) may receive, from a network entity via an optical wireless communication link, a first optical wireless signal using photodetectors positioned on a photodetector panel of the UE. The photodetector panel may include a hole around which the photodetectors are positioned and may be located a first distance from a curved optical device of the UE via which the first optical wireless signal is received. The UE may transmit, to the network entity via the optical wireless communication link, a second optical wireless signal using a light source of the UE that is located a second distance from the curved optical device via which the second optical wireless signal is transmitted. The second optical wireless signal may pass through the hole in the photodetector panel based on the second distance being greater than the first distance.

30 Claims, 16 Drawing Sheets

COAXIAL OPTICAL FRONT END FOR OPTICAL WIRELESS COMMUNICATION

FIELD OF TECHNOLOGY

The following relates to wireless communications, including a coaxial optical front end (OFE) for optical wireless communication (OWC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may perform optical wireless communication (OWC) with a network entity.

SUMMARY

The described techniques relate to improved methods, systems, devices, and apparatuses that support a coaxial optical front end (OFE) for optical wireless communications (OWC). For example, the described techniques provide for an OFE that includes one or more photodetectors and a light source positioned on a common axis. For example, the coaxial OFE may include an optical device (e.g., a lens or a mirror) operable to collimate and/or condense light, a photodetector panel on which the one or more photodetectors are positioned, and a light source. The light source may be located further from the optical device than the photodetector panel (e.g., behind the photodetector panel), and an optical wireless signal from the light source may be transmitted to the optical device via a hole in the photodetector panel to support uplink transmissions. As such, the coaxial OFE may support beam steering for both uplink and downlink transmissions. For example, a user equipment (UE) that implements the coaxial OFE may use beam steering to increase optical gain for optical wireless signals received or transmitted by the UE.

A method for OWC by a UE is described. The method may include receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received and transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

A UE for OWC is described. The UE may include at least one processor, and at least one memory coupled with the at least one processor, with instructions stored in the at least one memory. The instructions may be executed by the at least one processor, individually or in any combination, to cause the UE to receive, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received and transmit, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

Another UE for OWC is described. The UE may include means for receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received and means for transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

A non-transitory computer-readable medium storing code for OWC is described. The code may include instructions executable by at least one processor, individually or in any combination, to receive, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received and transmit, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

In some examples of the method. UEs, and non-transitory computer-readable medium described herein, transmitting the second optical wireless signal may include operations, features, means, or instructions for transmitting the second optical wireless signal via a first lens a third distance from the curved optical device and a second lens a fourth distance from the curved optical device, where the first lens collimates the second optical wireless signal from the light source to the second lens and the second lens condenses the second optical wireless signal through the hole of the photodetector panel.

In some examples of the method, UEs, and non-transitory computer-readable medium described herein, the third distance may be less than the second distance and greater than the fourth distance, and the fourth distance may be greater than the first distance.

In some examples of the method, UEs, and non-transitory computer-readable medium described herein, a fifth distance between the light source and the first lens corresponds to a focal length of the first lens.

In some examples of the method, UEs, and non-transitory computer-readable medium described herein, a first ratio of focal length to aperture diameter of the first lens may be the same as a second ratio of focal length to aperture diameter of the curved optical device.

In some examples of the method, UEs, and non-transitory computer-readable medium described herein, a first focal length of the first lens is the same as a second focal length of the second lens and less than a third focal length of the curved optical device.

In some examples of the method, UEs, and non-transitory computer-readable medium described herein, receiving the first optical wireless signal may include operations, features, means, or instructions for receiving the first optical wireless signal using a set of multiple photodetectors of the one or more photodetectors and performing an equal gain combination operation on a set of multiple signals output by the set of multiple photodetectors.

In some examples of the method, UEs, and non-transitory computer-readable medium described herein, the set of multiple photodetectors may be associated with a same radio frequency (RF) chain.

In some examples of the method, UEs, and non-transitory computer-readable medium described herein, receiving the first optical wireless signal may include operations, features, means, or instructions for receiving the first optical wireless signal using a first subset of photodetectors of the one or more photodetectors and a second subset of photodetectors of the one or more photodetectors, performing a first equal gain combination operation on a first set of multiple signals output by the first subset of photodetectors, and performing a second equal gain combination operation on a second set of multiple signals output by the second subset of photodetectors.

In some examples of the method, UEs, and non-transitory computer-readable medium described herein, the first subset of photodetectors may be associated with a first RF chain and the second subset of photodetectors may be associated with a second RF chain.

In some examples of the method, UEs, and non-transitory computer-readable medium described herein, the first distance may be less than a focal length of the curved optical device.

In some examples of the method, UEs, and non-transitory computer-readable medium described herein, the one or more photodetectors includes a first set of photodetectors, the first set of photodetectors including two photodetectors aligned vertically with the hole and two photodetectors aligned horizontally with the hole.

In some examples of the method, UEs, and non-transitory computer-readable medium described herein, the curved optical device may be a lens or a mirror.

A UE for OWC is described. The UE may include a curved optical device, a photodetector panel located a first distance from the curved optical device and including one or more photodetectors and a hole around which the one or more photodetectors are positioned, a light source located a second distance from the curved optical device, at least one processor, and at least one memory coupled with the at least one processor, with instructions stored in the at least one memory. The instructions may be executed by the at least one processor, individually or in any combination, to cause the UE to establish an OWC link with a network entity and communicate, with the network entity via the OWC link, one or more optical wireless signals using at least one of the light source or the one or more photodetectors of the photodetector panel.

In some examples of the UE, the instructions to communicate the one or more optical wireless signals are executable by the at least one processor, individually or in any combination, to cause the UE to transmit, using the light source, the one or more optical wireless signals through the hole of the photodetector panel via the curved optical device based on the second distance being greater than the first distance.

In some examples of the UE, the UE may include a first lens a third distance from the curved optical device, where the third distance is less than the second distance and greater than the first distance, and a second lens a fourth distance from the curved optical device, where the fourth distance is greater than the first distance and less than the third distance.

In some examples of the UE, the instructions to communicate the one or more optical wireless signals are executable by the at least one processor, individually or in any combination, to cause the UE to transmit, using the light source, the one or more optical wireless signals via the first lens, the second lens, and the curved optical device, where the first lens collimates the one or more optical wireless signals from the light source to the second lens and the second lens condenses the one or more optical wireless signals through the hole of the photodetector panel and to the curved optical device.

In some examples of the UE, a fifth distance between the light source and the first lens corresponds to a focal length of the first lens.

In some examples of the UE, the curved optical device, the photodetector panel, the first lens, the second lens, and the light source are aligned on a same axis.

In some examples of the UE, a first ratio of focal length to aperture diameter of the first lens is the same as a second ratio of focal length to aperture diameter of the curved optical device.

In some examples of the UE, a first focal length of the first lens is the same as a second focal length of the second lens and less than a third focal length of the curved optical device In some examples of the UE, a diameter of the curved optical device is greater than a diameter of the first lens and a diameter of the second lens.

In some examples of the UE, the instructions to communicate the one or more optical wireless signals are executable by the at least one processor, individually or in any combination, to cause the UE to receive the one or more optical wireless signals using a set of multiple photodetectors of the one or more photodetectors and perform an equal gain combination operation on a set of multiple signals output by the set of multiple photodetectors.

In some examples of the UE, the set of multiple photodetectors are associated with a same RF chain.

In some examples of the UE, the instructions to communicate the one or more optical wireless signals are executable by the at least one processor, individually or in any combination, to cause the UE to receive the one or more optical wireless signals using a first subset of photodetectors of the one or more photodetectors and a second subset of photodetectors of the one or more photodetectors, perform a first equal gain combination operation on a first set of multiple signals output by the first subset of photodetectors, and perform a second equal gain combination operation on a second set of multiple signals output by the second subset of photodetectors.

In some examples of the UE, the first subset of photodetectors is associated with a first RF chain and the second subset of photodetectors is associated with a second RF chain.

In some examples of the UE, each photodetector of the first subset of photodetectors is a first size and each photodetector of the second subset of photodetectors is a second size, the second size being larger than the first size.

In some examples of the UE, the first distance is less than a focal length of the curved optical device.

In some examples of the UE, the one or more photodetectors comprises a first set of photodetectors positioned on the photodetector panel, the first set of photodetectors comprising two photodetectors aligned vertically with the hole and two photodetectors aligned horizontally with the hole.

In some examples of the UE, the curved optical device is a lens or a mirror.

DETAILED DESCRIPTION

Figure 1:
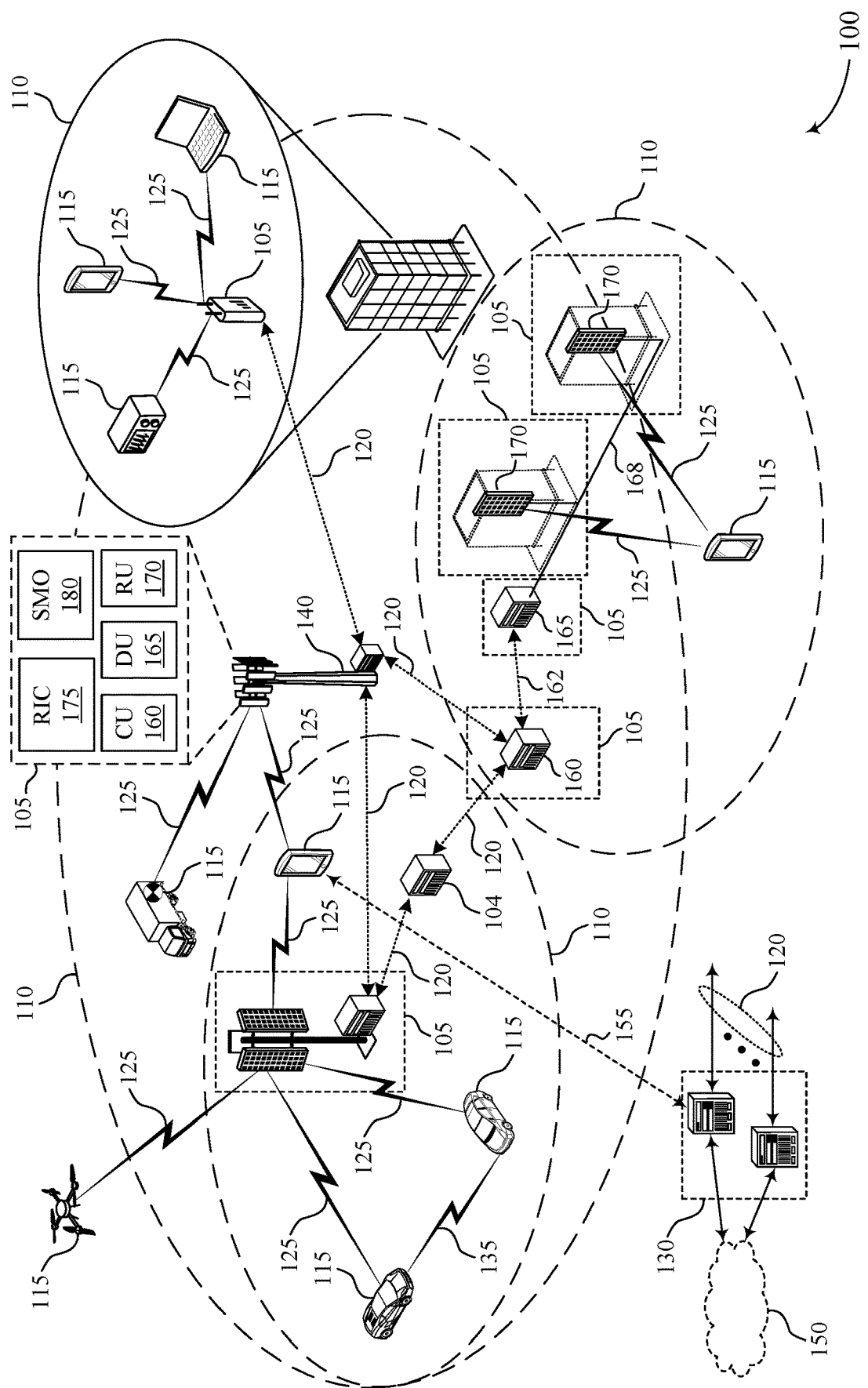
FIG. 1 shows an example of a wireless communications system that supports a coaxial optical front end (OFE) for optical wireless communication (OWC) in accordance with one or more aspects of the present disclosure.

Some wireless communications systems may support optical wireless communication (OWC). For instance, a first device, such as a user equipment (UE), may communicate with a second device, such as a network entity, via an OWC link. For example, the first device may transmit an optical wireless signal (e.g., a signal at a frequency within the range of $10^{13}$ to $10^{16}$ hertz (Hz), such as a signal in the infrared to ultraviolet spectrum) to the second device via a beam of light using a light source, and the second device may receive and measure the optical wireless signal using a photodetector, such as via a lens (e.g., a condenser lens), a mirror (e.g., a concave mirror), or other curved optical device that focuses the optical signal towards (e.g., onto, near) the photodetector. A combination of one or more curved optical devices (such as lenses and/or mirrors) and one or more optical communication components (such as light sources and/or photodetectors) used to communicate an optical wireless signal may be referred to as an optical front end (OFE) of a device that supports OWC.

In some examples, a UE may steer an uplink optical wireless signal via a lens that collimates a transmitted beam of light from a light source and may steer a downlink optical wireless signal via the lens that focuses (e.g., condenses) the downlink optical wireless signal towards a photodetector. An optimal position for both the light source and the photodetector relative to the lens in order to maximize optical gain may be the same, however, both the light source and photodetector cannot occupy the same space within the OFE. In some cases, the UE may use separate OFEs for uplink and downlink (e.g., positioning the OFEs in parallel) or may use a dichroic mirror that is used to reflect either signal from the light source or to the photodetector, such that the light source or the photodetector may be positioned off-axis relative to the lens. However, using separate OFEs or a dichroic mirror for uplink and downlink may be expensive to implement (e.g., due to the use of additional large lenses or the dichroic mirror) or may take up an excessive amount of space in a container of the OFE (e.g., lens tube).

In accordance with examples described herein, a UE (e.g., or a network entity) may implement a coaxial OFE that supports beam steering for reception and transmission of optical wireless signals at the UE (or network entity). For example, the OFE may include a curved optical device (e.g., lens, mirror), a light source located a first distance from the curved optical device, and a photodetector panel located in between, and on a same axis with, the curved optical device and the light source. The photodetector panel may include one or more photodetectors and a central hole around which the one or more photodetectors are positioned. Accordingly, the UE may receive a downlink optical wireless signal via the curved optical device that directs (e.g., focuses, condenses) the downlink optical wireless signal toward the one or more photodetectors of the photodetector panel. The UE may transmit an uplink optical wireless signal using the light source, and the uplink wireless signal may pass through the hole in the photodetector panel to the curved optical device that collimates the uplink optical wireless signal for transmission. In some examples, the OFE may include a relay subsystem of lenses located between the light source and the photodetector panel. The subsystem of lenses may be used to collimate an optical wireless signal from the light source and subsequently condense the optical wireless signal toward the hole in the photodetector panel.

By implementing the coaxial OFE, a UE (e.g., or a network entity) may support optical beam steering, increasing coverage of an OWC system, increasing a quality of OWC, and facilitating miniaturization of UEs that support OWC. For example, by positioning optical communication components on a same axis, the UE or the network entity may reduce a physical space that the OFE occupies while supporting both uplink and downlink beam steering. In some examples, the OFE may be contained in a lens tube, and the coaxial OFE may support reducing a size or a diameter of the lens tube, thus miniaturizing the UE and improving a form factor of the UE. In some examples, the coaxial OFE may enable a UE to perform beam steering in both the uplink and downlink transmission direction, and locations (e.g., distances) of optical communication components in the OFE relative to each other may be determined to increase (e.g., balance) optical gains for both receiving and transmitting optical wireless signals. Increasing optical gains associated with the optical wireless signals may support increased accuracy or efficiency of OWC between the UE and the network entity. In some implementations, the gain of a communicated optical wireless signal may increase as a result of the UE performing equal gain combination on the signal received via an array of photodetectors positioned on the photodetector panel. Such equal gain combination may support a reduced quantity of radio frequency (RF) chains used to support the photodetector panel (e.g., as compared to having a respective RF chain for each photodetector of the photodetector panel).

Aspects of the disclosure are initially described in the context of wireless communications systems. Aspects of the disclosure are further described in the context of wireless communications systems, OFEs, photodetector panel configurations, and process flows. Aspects of the disclosure are further illustrated by and described with reference to apparatus diagrams, system diagrams, and flowcharts that relate to a coaxial OFE for OWC.

FIG. 1 shows an example of a wireless communications system 100 that supports a coaxial OFE for OWC in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a coaxial OFE for OWC as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape (e.g., steer) an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, a UE 115 may communicate with a network entity 105 via an optical wireless communication link. For example, the network entity 105 may communicate an optical wireless signal with the UE 115 via a beam of light, which may be received and measured using optical components of the UE 115 or network entity 105. Optical components of the UE 115 or network entity 105 may be used to transmit or receive an optical wireless signal. Optical components may include, for example, one or more lenses (e.g., condenser lenses) or mirrors (e.g., concave mirrors, reflectors) that may focus the optical wireless signal towards one or more photodetectors. Additionally, or alternatively, the optical components may include one or more light sources and one or more lenses (such as same or different lenses) or mirrors that may collimate optical wireless signals emitted (for example, output) by the one or more light sources. A combination of optical components (e.g., a combination of one or more lenses, one or more mirrors, one or more photodetectors, one or more light sources) may be referred to as an OFE of the UE 115 or network entity 105.

In accordance with examples described herein, a UE 115 may support communicating optical wireless signals with a network entity 105 using a coaxial OFE. For example, a UE 115 may receive, from a network entity 105 via an optical wireless communication link, a first optical wireless signal using one or more photodetectors positioned on a photodetector panel of the UE 115. The photodetector panel may include a hole around which the one or more photodetectors are positioned and may be located a first distance from a curved optical device (such as a lens or a mirror) of the UE 115 via which the first optical wireless signal is received. The UE 115 may transmit, to the network entity 105 via the optical wireless communication link, a second optical wireless signal using a light source of the UE 115 that is located a second distance from the curved optical device via which the second optical wireless signal is transmitted. The second optical wireless signal may pass through the hole in the photodetector panel based on the second distance being greater than the first distance. The OFE may include the curved optical device, the photodetector panel, and the light source, which may each be located along a same axis, and may thus be referred to as a coaxial OFE.

Figure 2:
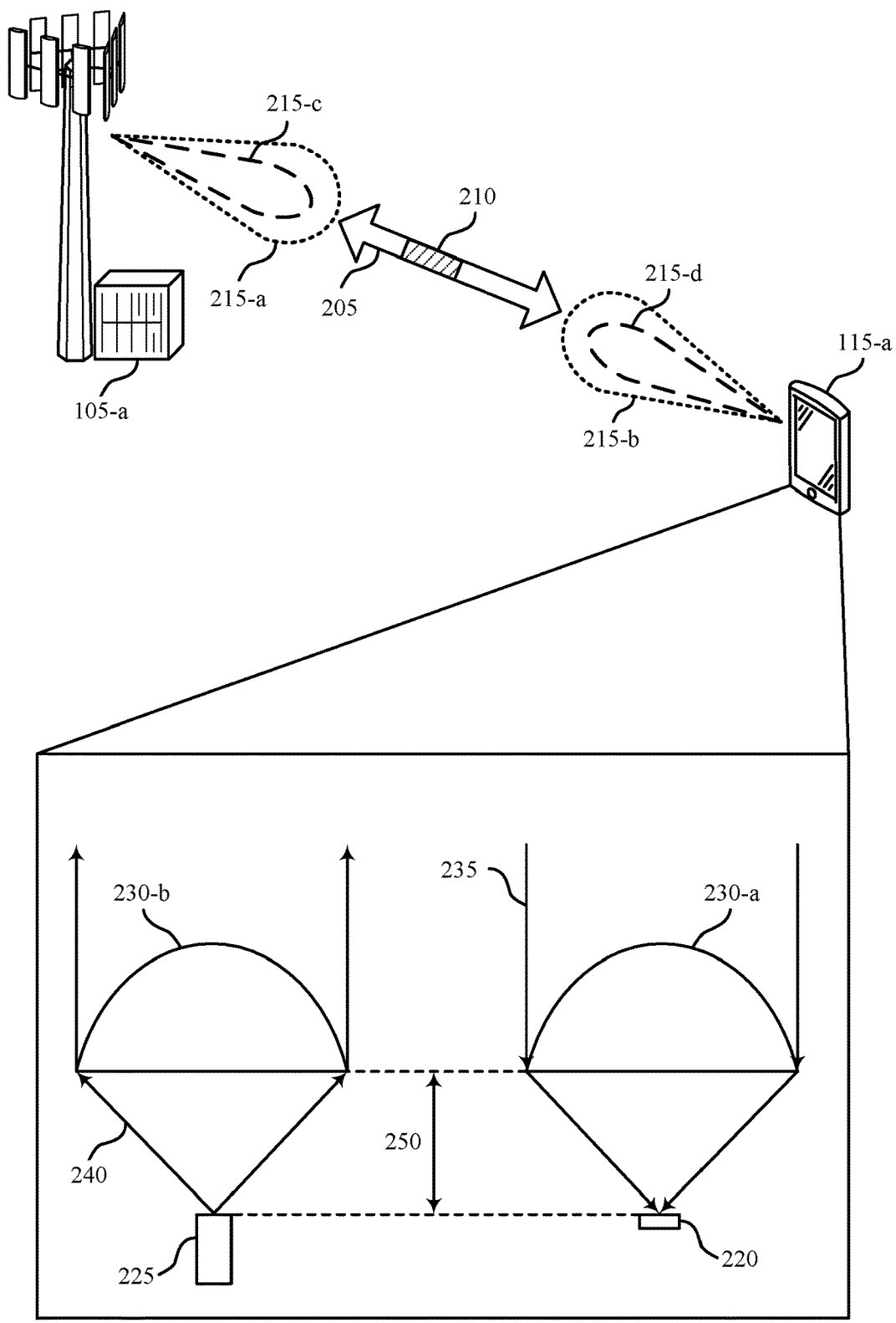
FIG. 2 shows an example of a wireless communications system that supports a coaxial OFE for OWC in accordance with one or more aspects of the present disclosure.

FIG. 2 shows an example of a wireless communications system 200 that supports a coaxial OFE for OWC in accordance with one or more aspects of the present disclosure. In some examples, aspects of the wireless communications system 200 may implement or be implemented by aspects of the wireless communications system 100. For example, the wireless communications system 200 may include a UE 115-a and a network entity 105-a, which may be examples of the corresponding devices as described herein, including with reference to FIG. 1.

In some wireless communication systems, a UE 115-a and a network entity 105-a may communicate information via an optical RF band. For example, the UE 115-a and the network entity 105-a may communicate information in a frequency band of (approximately) $10^{13}$ to $10^{16}$ Hz, such as in the infrared to ultraviolet spectrum. Communications in this frequency band may be referred to as optical communications.

In some examples, the UE 115-a and the network entity 105-a may support OWC. For example, the UE 115-a and the network entity 105-a may transmit optical wireless signals 210, such as beams of light, via an optical wireless communication link 205. The optical wireless communication link 205 may be an example of a communication link 125 via which optical wireless signals 210 may be communicated. In some examples, the network entity 105-a and the UE 115-a may communicate using optical beams 215 of varying widths. For example, the network entity 105-a and the UE 115-a may communicate using relatively wider beams, such as an optical beam 215-a and an optical beam 215-b, respectively. In some cases, the network entity 105-a and the UE 115-a may communicate using relatively narrower optical beams 215, such as an optical beam 215-c and an optical beam 215-d, respectively.

In some optical wireless communication systems, the network entity 105-a may transmit an optical wireless signal 210 to the UE 115-a by amplifying the optical wireless signal 210 using a power amplifier, emitting the optical wireless signal 210 using a light source 225, such as a laser light source, and forming an optical beam 215 using a lens (e.g., a condenser lens, a collimating lens), such as a lens 230, or a mirror. In some cases, the UE 115-a may receive the optical wireless signal 210 by condensing the optical wireless signal 210 onto a photodetector 220 using a lens 230-a. The photodetector 220 and the lens 230-a (e.g., or mirror) may be components of a receive OFE of the UE 115-a. The photodetector 220 may include an array of silicon photomultipliers (SiPM) which may increase a gain of the received optical wireless signal 210.

In some examples, the UE 115-a may similarly transmit the optical wireless signal 210 and the network entity 105-a may similarly receive the optical wireless signal 210. For example, the UE 115-a may transmit an optical wireless signal 210 to the network entity 105-a by amplifying the optical wireless signal 210 using a power amplifier, emitting the optical wireless signal 210 using a light source 225, and forming an optical beam 215 using a lens, such as a lens 230-b, or a mirror (e.g., a reflector). The power amplifier, the light source 225, and the lens 230-b (e.g., or mirror) may be components of a transmit OFE of the UE 115-a. The network entity 105-a may receive the optical wireless signal 210 at an OFE (e.g., a receive OFE) of the network entity 105-a, which may be similar to the receive OFE of the UE 115-a.

In some examples, a lens 230 may be an aspheric lens. A lens may include one or more convex lenses oriented together such that a boresight ray 235 entering a curved surface of the lens 230 may exit a flat surface of the lens 230 and focus to the photodetector 220. Additionally, an off-axis ray 240 entering the flat surface of a lens 230 may exit the curved surface of the lens 230 and collimate to in a boresight direction of the lens 230. In some examples, such focusing of a boresight ray 235 to a photodetector 220 and collimating an off-axis ray 240 from a light source 225 may be based on the photodetector 220 and the light source 225 being positioned at focal points of the respective lenses 230.

The process of condensing an optical wireless signal 210 (e.g., using the lens 230-a or a mirror) may be referred to as receive beam steering. The receive beam steering gain of the optical wireless signal 210 (e.g., received in the boresight direction) detected by the photodetector 220 may be described by $10*\log_{10} A_1/A_2$, in which $A_1$ is the area of the lens 230-a and $A_2$ is the area (e.g., sensitivity area) of the photodetector 220. In some examples, the UE 115-*a* may obtain a maximum optical gain for reception of the optical wireless signal 210 by placing the photodetector 220 at, or close to, the focal length 250 (e.g., focal distance) of the lens 230-*a*.

The UE 115-*a* may perform transmit beam steering using a transmit OFE. In some cases, the UE 115-*a* may have a transmit power less than that of the network entity 105-*a* (e.g., by approximately 7 to 10 dB), and, in some cases, the network entity 105-*a* receiving uplink optical wireless signals 210 from the UE 115-*a* may not use mechanical beam steering techniques if serving multiple UEs 115. In some examples, the UE 115-*a* may obtain a maximum optical gain for transmission of the optical wireless signal 210 by placing the light source 225 at, or close to, the focal length 250 of the lens 230-*b*, which the UE 115-*a* may use as a collimating lens for transmit beams.

In some examples, due to the UE 115-*a* performing receive beam steering and transmit beam steering to maximize gain for receive and transmit beams, respectively, the receive OFE of the UE 115-*a* and the transmit OFE of the UE 115-*a* may compete for the same space. For example, the placement of the lens 230 relative to the light source 225 or relative to the photodetector 220 to support maximum optical gain may be the same, or approximately the same, for both the receive OFE and the transmit OFE. For instance, the placement of the photodetector 220 and of the light source 225 may both be at a focal length 250 of the lens 230 to produce the maximum optical gain for both reception and transmission of optical wireless signals 210. However, the light source 225 and the photodetector 220 may be independent physical components that cannot occupy the same physical space (e.g., of a lens tube that contains the OFE) at the focal length 250 of the lens 230.

In some examples, rather than using a single lens 230 as part of a single OFE for both uplink and downlink communications, the UE 115-*a* may use a receive OFE and a transmit OFE that are independent from each other. For example, the UE 115-*a* may use a lens 230-*a* for the receive OFE and a lens 230-*b* for the transmit OFE, and the UE 115-*a* may position the receive OFE and the transmit OFE in parallel (e.g., side-by-side, on different axes) based on the receive beams and the transmit beams having the same, or approximately the same, optical path for receive beam steering and transmit beam steering. However, putting the multiple lenses 230 in parallel may increase a size of an OFE (e.g., a lens tube) that contains the multiple lenses 230 (e.g., the transmit OFE and the receive OFE). For example, a diameter of the lens tube (e.g., a minimum diameter) may be limited by the parallel placement of the receive OFE and the transmit OFE.

In some cases, the UE 115-*a* may use a dichroic mirror and may use the same lens 230 for beam steering of both transmit beams and receive beams. Transmit and receive beams may be communicated via different wavelengths, and the dichroic mirror may reflect some wavelengths while transmitting other wavelengths. For example, the UE 115-*a* may use the dichroic mirror to reflect wavelengths associated with transmit beams, while wavelengths associated with receive beams may pass through the dichroic mirror. However, the dichroic mirror may be expensive to manufacture or implement, and/or the use of the dichroic mirror for beam steering may depend on a relatively greater quantity of lenses at the UE 115-*a* used in conjunction with the dichroic mirror. Further, placement of a light source 225 or photodetector 220 off-axis relative to a lens 230 and dichroic mirror in order to implement the dichroic mirror may increase a size of an OFE containing such components.

In accordance with examples described herein, the UE 115-*a* may implement a coaxial OFE to perform beam steering for both receive and transmit beams. For example, the UE 115-*a* may position the light source 225 a distance away from a lens 230 and may position a photodetector panel in between, and on the same axis as, the lens 230 and the light source 225. The photodetector panel may include one or more photodetectors 220, for receiving optical wireless signals 210, and a hole around which the one or more photodetectors 220 are positioned, through which the UE 115-*a* transmits optical wireless signals 210 to the network entity 105-*a* via the lens 230.

Figure 3:
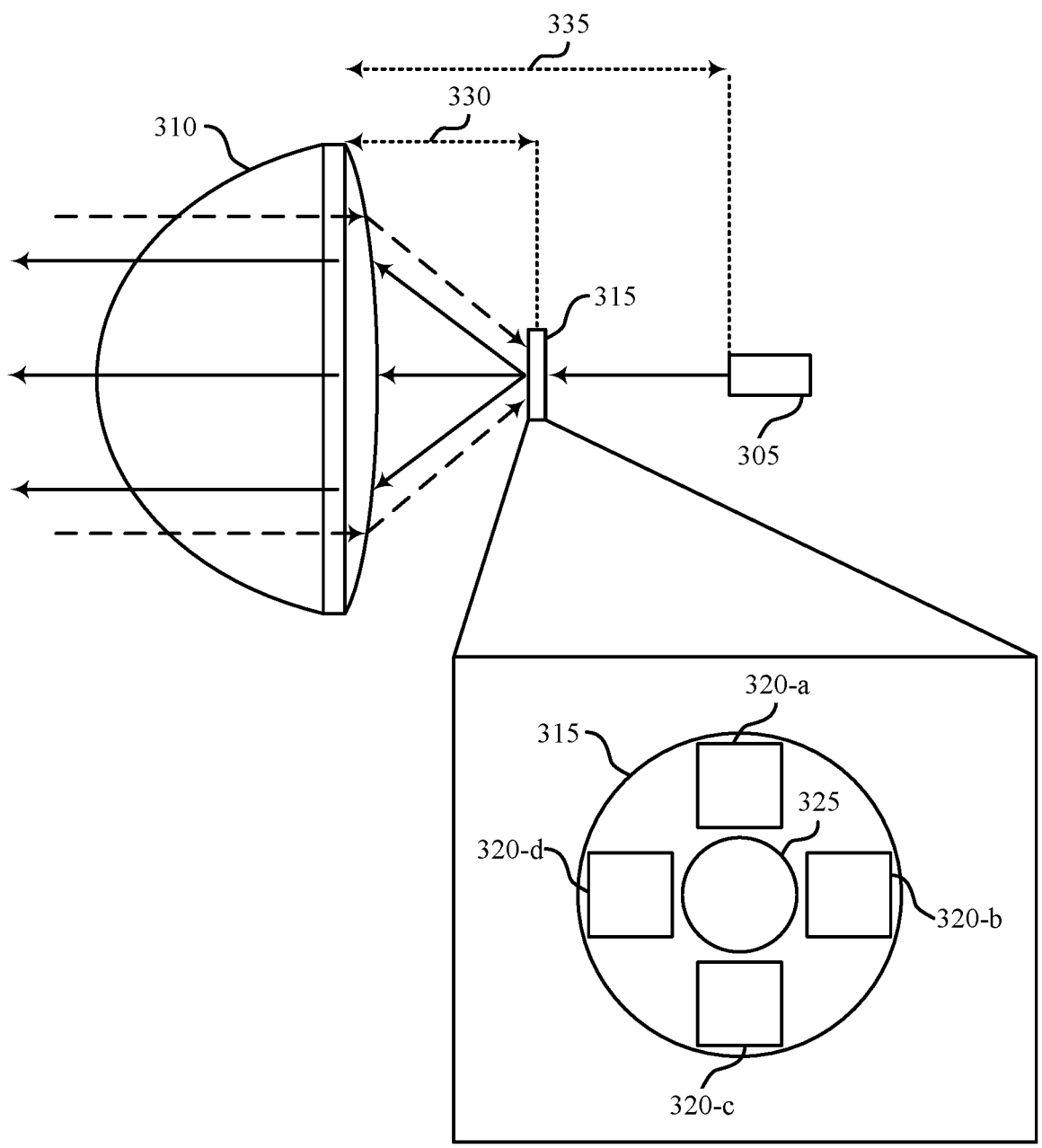
FIGS. 3 and 4 show examples of OFEs that support a coaxial OFE for OWC in accordance with one or more aspects of the present disclosure.

FIG. 3 shows an example of an OFE 300 that supports a coaxial OFE for OWC in accordance with one or more aspects of the present disclosure. In some examples, aspects of the OFE 300 may implement or be implemented by aspects of the wireless communications system 100 and/or the wireless communications system 200. For example, the OFE 300 may be included in or implemented by a UE 115 and/or a network entity 105, which may be examples of the corresponding devices as described herein, including with reference to FIGS. 1 and 2.

The OFE 300 may include a photodetector panel 315 that includes a hole 325 and one or more photodetectors 320 (e.g., an array of photodetectors 320). In some cases, the photodetector panel may be a printed circuit board (PCB) for receiving optical wireless signals (e.g., a receive PCB). In some examples, other circuitry may be included on the photodetector panel 315 to support reception of an optical wireless signal. In some examples, the hole 325 may be centrally located at the photodetector panel 315, and the one or more photodetectors 320 may be positioned around the central hole 325. In some examples, the hole 325 may be located elsewhere on the photodetector panel 315. A UE 115 or a network entity 105 may use the one or more photodetectors 320 to receive optical wireless signals. The photodetector panel may be positioned a distance 330 (e.g., $d_{RX}$) from a lens 310 of the OFE 300, and the distance 330 may be determined to collect a maximum amount of power from received optical wireless signals (e.g., downlink optical wireless signals) in accordance with, for example, a focal length of the lens 310, a configuration of the one or more photodetectors 320, a size of the hole 325, a position of a light source 305 of the OFE 300 within the OFE 300, transmission characteristics associated with the light source 305 (e.g., directivity, power, frequency), among other factors.

For example, the photodetector panel 315 may be positioned close to a focal point of the lens 310. In some examples, the distance 330 may be less than the focal length of the lens 310 which may allow optical wireless signals to be received at the photodetectors 320 of the photodetector panel 315 rather than at the center of the photodetector panel 315, where the hole 325 is positioned. The distance 330 may also be determined to reduce blockage of optical wireless signals (e.g., uplink optical wireless signals) that are transmitted by the light source 305.

The hole 325 of the photodetector panel 315 may enable the UE 115 to transmit uplink optical wireless signals from a light source 305 through the hole 325 to the lens 310. The hole 325 may be various sizes, and in some cases may have a diameter of 0.1 mm, 1 mm, or 3 mm, among other diameters. Additionally, the hole 325 may have various shapes. For example, in the example of FIG. 3, the hole 325 is depicted as having a circular shape, however, other shapes (e.g., square, rectangular, diamond, oval, and the like) are possible. In some examples, the light source 305 may be positioned a distance 335 (e.g., $d_{TX}$) from the lens 310, and the distance 335 may be determined to achieve a maximum transmit optical gain (e.g., in view of a constraint that the light source 305 may not be positioned at the focal point of the lens 310). For example, the light source 305 may be positioned at the distance 335 such that an image of the light source 305 (e.g., an image of a transmitted optical wireless signal) is at or close to the focal point of the lens 310 (e.g., as close to the focal point of the lens 310 as possible in view of the constraint that the light source 305 is not positioned at the focal point of the lens 310). The hole 325 may be positioned such that the image of the light source 305 may pass through the hole 325 and to the lens 310 for transmission.

In the example of FIG. 3, the photodetector panel 315 may include four photodetectors 320: a photodetector 320-a, a photodetector 320-b, a photodetector 320-c, and a photodetector 320-d. In some examples, one or more of the photodetectors 320 may be an SiPM. In some examples, one or more of the photodetectors 320 may have a size of 1 mm by 1 mm. Various configurations of photodetectors 320 on the photodetector panel 315 are possible, for example, as described with reference to FIGS. 5A through 5D.

A size of the hole 325 may balance various considerations. For example, optical wireless signals received at the photodetector panel 315 may undergo higher loss due at greater sizes of the hole 325 (e.g., if the hole 325 has a diameter of 3 mm). However, blockage of optical wireless signals transmitted by the light source 305 may be reduced at greater sizes of the hole 325. In some examples, the UE 115 may use a photodetector with a smaller hole 325, such as a hole with a 1 mm diameter. Using the hole 325 with the smaller diameter (e.g., 1 mm) may enable the photodetectors 320 to be positioned closer to an optical axis (e.g., a central axis for the lens 310 and/or the photodetector panel 315). By being positioned closer to the optical axis, the photodetectors 320 may collect more power from optical wireless signals due to light condensing. The lens 310, the photodetector panel 315, and the light source 305 may be aligned (e.g., centrally aligned) with respect to the optical axis (e.g., a central axis of the lens 310, such as along a boresight direction of the lens 310).

The lens 310 may serve as a common lens for both receive beams and transmit beams for beam steering of optical wireless signals. For example, the UE 115 may receive a downlink optical wireless signal from a network entity 105 via the lens 310 such that the lens 310 condenses light of the downlink optical wireless signal toward the photodetectors 320 of the photodetector panel 315. The UE 115 may transmit an uplink optical wireless signal to the network entity 105 via the lens 310 such that light emitted (e.g., transmitted) from the light source 305 pass through the hole 325 of the photodetector panel 315 to reach the lens 310. The lens 310 may collimate the light of the uplink optical wireless signal (e.g., light corresponding to the image of the light source 305), and a network entity 105 may receive the uplink optical wireless signal.

Figure 4:
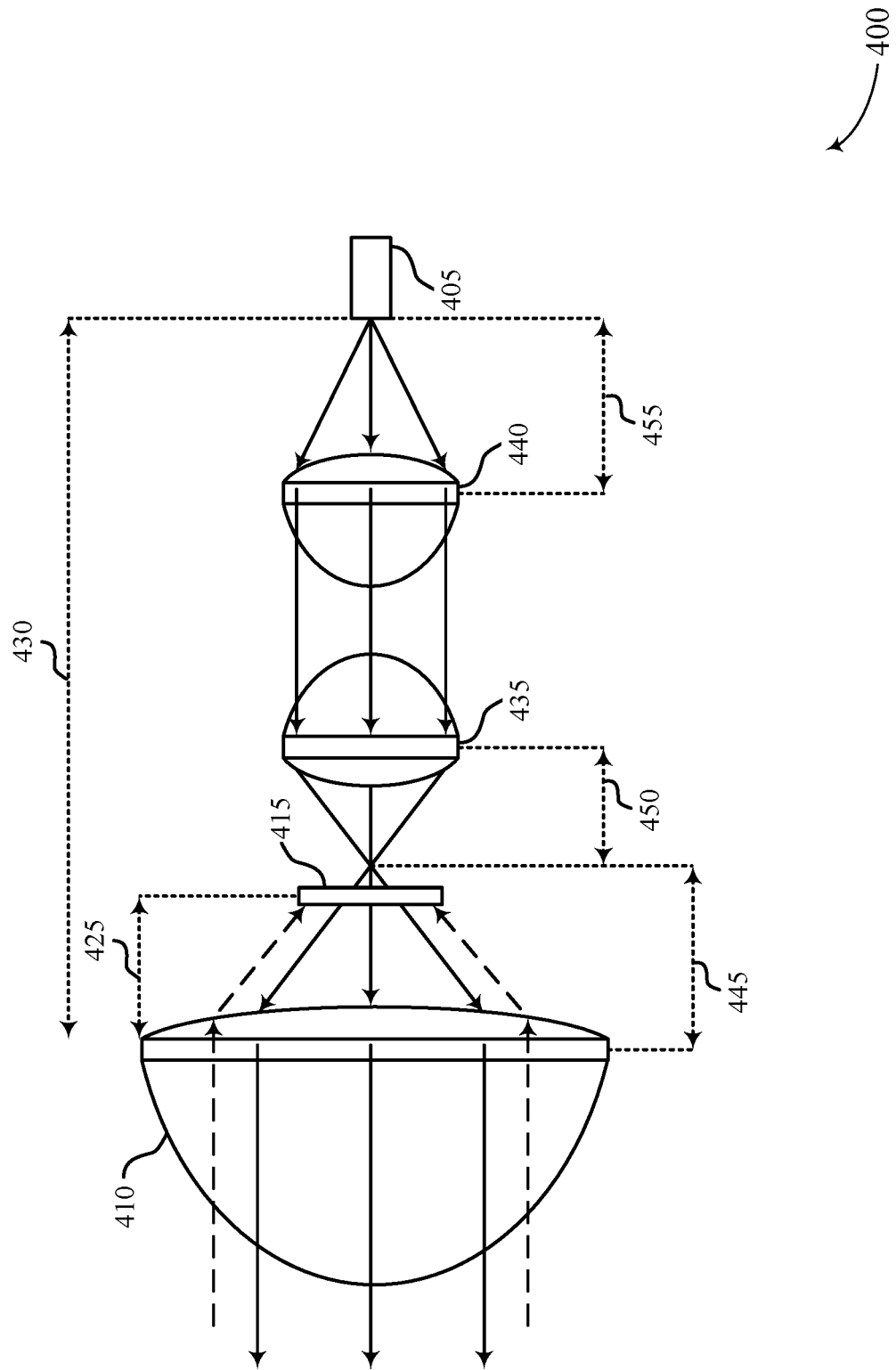

FIG. 4 shows an example of an OFE 400 that supports a coaxial OFE for OWC in accordance with one or more aspects of the present disclosure. In some examples, aspects of the OFE 400 may implement or be implemented by aspects of the wireless communications system 100 and/or the wireless communications system 200. For example, the OFE 400 may be included in or implemented by a UE 115 and/or a network entity 105, which may be examples of the corresponding devices as described herein, including with reference to FIGS. 1 and 2.

The OFE 400 may include an optical relay sub-system including a lens 435 and a lens 440 to support transmission of uplink optical wireless signals. For example, the lens 435 and the lens 440 may be positioned in between a light source 405 of the OFE 400 and a photodetector panel 415 (e.g., a photodetector panel 315) of the OFE 400 and may be used to form an image of the light source 405. The image of the light source 405 may be formed between the lens 435 and the photodetector panel 415, or the image may be formed at or around the hole in the photodetector panel 415. For example, the image of the light source 405 may be formed at, or near, a focal point of a lens 410 of the OFE 400 (e.g., a lens 310). The light of the image may pass through a hole (e.g., a hole 325) in the photodetector panel 415 to reach the lens 410. In some examples, a size (e.g., a diameter, such as an aperture diameter) of the lens 410 may be larger than a size (e.g., a diameter, such as an aperture diameter) of either of the lens 435 or the lens 440. In some examples, the lens 435 and the lens 440 may be the same size (e.g., have a same diameter, such as a same aperture diameter) and/or may be of a same or similar lens type. In some examples, a focal length 450 (e.g., a focal distance) of the lens 435 may be the same as a focal length 455 of the lens 440. In some examples, the focal lengths 450 and 455 may be different.

In some cases, the focal length 450 and the focal length 455 may be the less than a focal length 445 of the lens 410. In some examples, the lens 410 and the lens 435 (e.g., and the lens 440) may be of a same or similar lens type or may share common optical characteristics or parameters. For example, the lens 410 and the lens 435 may have a same (e.g., or similar) f-number (e.g., f-stop). That is, a ratio of the focal length 450 to the diameter (e.g., aperture diameter) of the lens 435 may be the same as a ratio of the focal length 445 to the diameter (e.g., aperture diameter) of the lens 410. In some examples, the focal length 450 may be less than the focal length 445, for example, due to the lens 410 and the lens 435 having the same f-number and the diameter of the lens 410 being greater than the diameter of the lens 435. In some examples, the lens 435 may have optical characteristics that are based on the focal length 445 or other optical parameters of the lens 410, which may enable the lens 435 to maximize optical gain of transmitted optical wireless signals from the light source 405 via the lens 410. Such optical characteristics of the lens 435 (e.g., or optical characteristics of the lens 440) may support efficiently transmitting light from the light source 405 through the hole in the photodetector panel 415 and to the lens 410 with reduced loss, for example, relative to a coaxial OFE (e.g., an OFE 300) that does not implement the relay sub-system of the lens 435 and the lens 440.

The OFE 400 may utilize the optical relay sub-system, as well as the light source 405, the photodetector panel 415, and the lens 410, to perform beam steering for receive beams and transmit beams of optical wireless signals in accordance with a single, coaxial OFE. The light source 405, the photodetector panel 415, the lens 410, the lens 435, and the lens 440 may be aligned (e.g., aligned centrally) on a common axis. Receive beams and transmit beams for a UE 115 using the OFE 400 may pass through the same lens 410. The lens 410 may condense receive (e.g., downlink) light toward one or more photodetectors of the photodetector panel 415, and the lens 410 may collimate transmit (e.g., uplink) light that pass through a hole in the photodetector panel 415 and that are also transmitted via the lens 440 and the lens 435 before reaching the lens 410. The transmitted light may be shaped by the optical relay sub-system which may form an image of the light source 405 around, or at, the hole in the photodetector panel 415 (e.g., at or near the focal length 445).

The photodetector panel 415 may be positioned a distance 425 from the lens 410. The distance 425 may be determined to maximize condensing (e.g., beam steering) gain for downlink optical wireless signals received at photodetectors of the photodetector panel 415. In some examples, the distance 425 may be less than the focal length 445. The light source 405 may be positioned a distance 430 from the lens 410, which may allow for transmission of light beams via the optical relay sub-system and through the hole in the photodetector panel 415 before reaching the lens 410. The distance 430 may be determined to maximize beam steering gain. For example, the image of the light source 405 may be formed at, or close to, the focal length 445 of the lens 410 based on the distance 430 (e.g., and distances of the lens 435 and the lens 440). The image of the light source 405 may be formed or shaped at the focal length 445 of the lens to increase (e.g., maximize) the optical gain of uplink light beams transmitted by the light source 405.

FIGS. 5A, 5B, 5C, and 5D show examples of a photodetector panel configuration 500, a photodetector panel configuration 520, a photodetector panel configuration 525, and a photodetector panel configuration 530, respectively, that support a coaxial OFE for OWC in accordance with one or more aspects of the present disclosure. In some examples, aspects of the photodetector panel configuration 500, the photodetector panel configuration 520, the photodetector panel configuration 525, and the photodetector panel configuration 530 may implement or be implemented by aspects of the wireless communications system 100 and/or the wireless communications system 200. For example, the photodetector panel configuration 500, the photodetector panel configuration 520, the photodetector panel configuration 525, and the photodetector panel configuration 530 may be included in or implemented by a UE 115 and/or a network entity 105, which may be examples of the corresponding devices as described herein, including with reference to FIGS. 1 through 4. The photodetector panel configurations may be implemented by a photodetector panel of an OFE, such as a photodetector panel 315 or an OFE 300 or a photodetector panel 415 of an OFE 400.

Figure 5A:
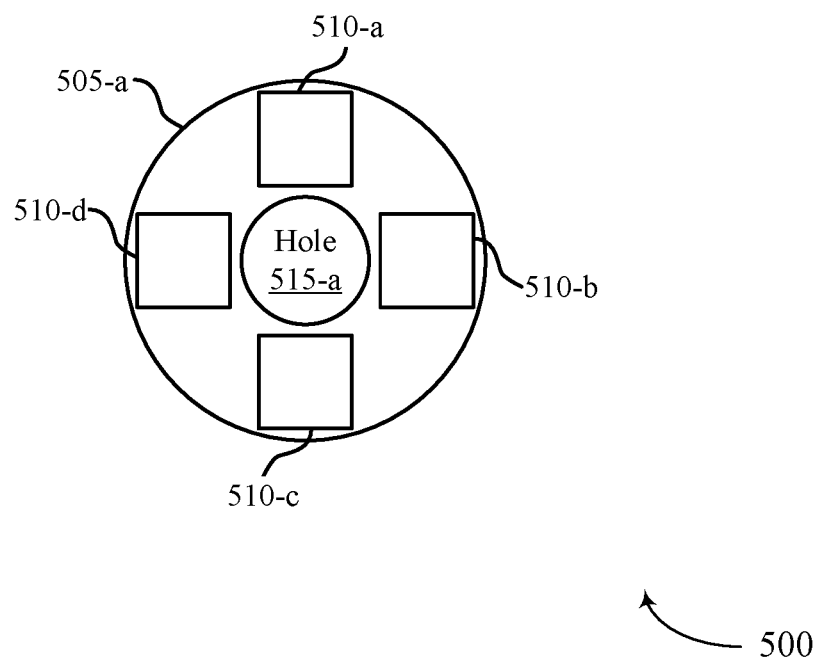
FIGS. 5A, 5B, 5C, and 5D show examples of photodetector panel configurations that support a coaxial OFE for OWC in accordance with one or more aspects of the present disclosure.

Referring to FIG. 5A, the photodetector panel configuration 500 may include a photodetector panel 505-*a* that includes a hole 515-*a* and a set of four photodetectors 510 positioned around the hole 515-*a*. In some examples, the photodetectors 510 may be SiPMs. A photodetector 510-*a* and a photodetector 510-*c* may be positioned above and below the hole 515-*a*, respectively, and may be aligned vertically with the hole 515-*a*. A photodetector 510-*b* and a photodetector 510-*d* may be positioned to the right of and to the left of the hole 515-*a*, respectively, and may be aligned horizontally. In some examples, the hole 515-*a* may have a diameter of 3 mm (e.g., or some other diameter) and the photodetectors 510 may have dimensions 1 mm by 1 mm (among other sized photodetectors 510). In some examples, the hole 515-*a* may have a circular shape. In some examples, the hole 515-*a* may have another shape (e.g., with varying dimensions, such as varying widths and lengths).

The UE 115 may measure an optical wireless signal using each of the multiple photodetectors 510 and may perform equal gain combination to combine the measurements (e.g., outputs) from each of the multiple photodetectors 510. For example, the photodetectors 510 be positioned on the photodetector panel 505-*a* such that each photodetector 510 may output a similar electrical signal, such as near enough to homogenous such that equal gain combination of the respectively output electrical signals may be performed. Thus, the UE 115 may measure a relatively higher total signal gain than a single photodetector 510, which may result in an increased quality of communications. The UE 115 may perform equal gain combination (e.g., may process an output for equal gain combination) for the photodetector 510-*a*, the photodetector 510-*b*, the photodetector 510-*c*, and the photodetector 510-*d* using a single RF chain. For example, the UE 115 may receive one or more optical wireless signals using the photodetectors 510 and may perform an equal gain combination operation on multiple signals output by the photodetectors 510. The photodetector 510-*a*, the photodetector 510-*b*, the photodetector 510-*c*, and the photodetector 510-*d* may be associated with (e.g., included in) the same RF chain. As such, an OFE that includes the photodetector panel 505-*a* may include a reduced quantity of RF chains relative to if each photodetector 510 was associated with a respective RF chain. In some examples, each photodetector 510 may be associated with a respective RF chain, and equal gain combination may not be performed in receiving an optical wireless signal.

Figure 5B:
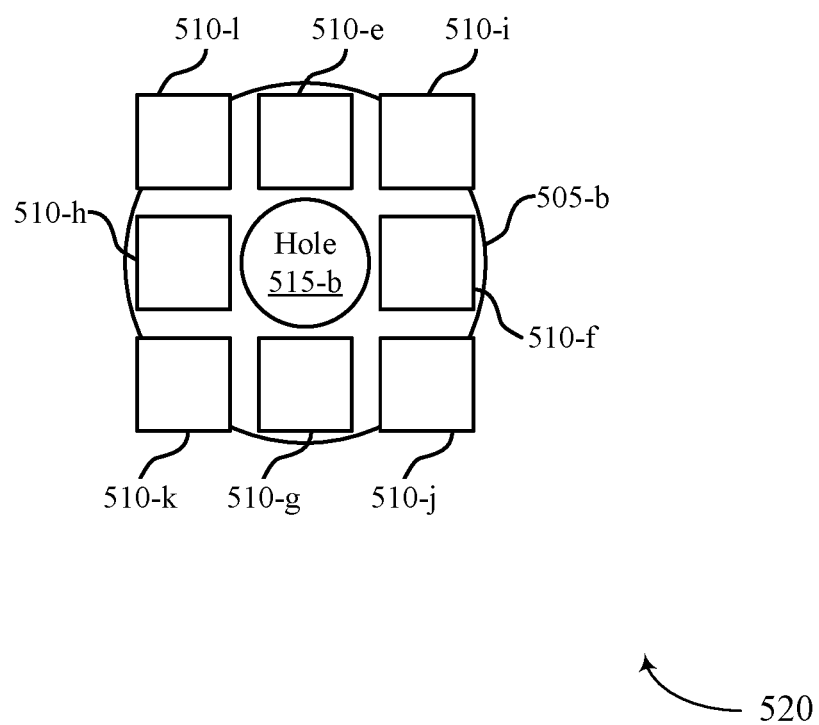

Referring to FIG. 5B, the photodetector panel configuration 520 may include a photodetector panel 505-*b* that includes a hole 515-*b*, a first set of photodetectors 510, which may be associated with a first RF chain, and a second set of photodetectors 510, which may be associated with a second RF chain. The hole 515-*b* may be an example of the hole 515-*a*. In some examples, the photodetectors 510 may be SiPMs. The photodetectors 510 of the first and second sets may each have the same dimensions, such as each having dimensions of 3 mm by 3 mm or of 1 mm by 1 mm (among other possible dimensions). The first set of photodetectors may include a photodetector 510-*c*, a photodetector 510-*f*, a photodetector 510-*g*, and a photodetector 510-*h* (e.g., photodetectors 510 aligned vertically and horizontally with respect to the hole 515-*b*). The second set of photodetectors may include a photodetector 510-*i*, a photodetector 510-*j*, a photodetector 510-*k*, and a photodetector 510-1 (e.g., photodetectors aligned diagonally with respect to the hole 515-*b*).

The UE 115 may perform equal gain combination (e.g., in the analog domain) for each of the first set of photodetectors 510 and the second set of photodetectors 510 using the first RF chain and the second RF chain, respectively. For example, the UE 115 may receive one or more optical wireless signals using the first set of photodetectors 510 and the second set of photodetectors 510. The first set of photodetectors 510 may be positioned on the photodetector panel 505-*b* such that each photodetector 510 may output a similar electrical signal with respect to other photodetectors 510 of the first set. Additionally, the second set of photodetectors may be positioned on the photodetector panel 505-*b* such that each photodetector 510 may output a similar electrical signal with respect to other photodetectors 510 of the second set. Accordingly, the UE 115 may perform a first equal gain combination operation on a first set of signals output by the first set of photodetectors 510 and may perform a second equal gain combination operation on a second set of signals output by the second set of photodetectors 510. Two RF chains may be sufficient for the UE 115 to process the output of the first and second equal gain combinations, which may reduce a quantity of RF chains associated with an OFE that includes the photodetector panel 505-*b* relative to if each photodetector 510 was associated with a respective RF chain. In some examples, each photodetector 510 may be associated with a respective RF chain, and equal gain combination may not be performed in receiving an optical wireless signal.

Figure 5C:
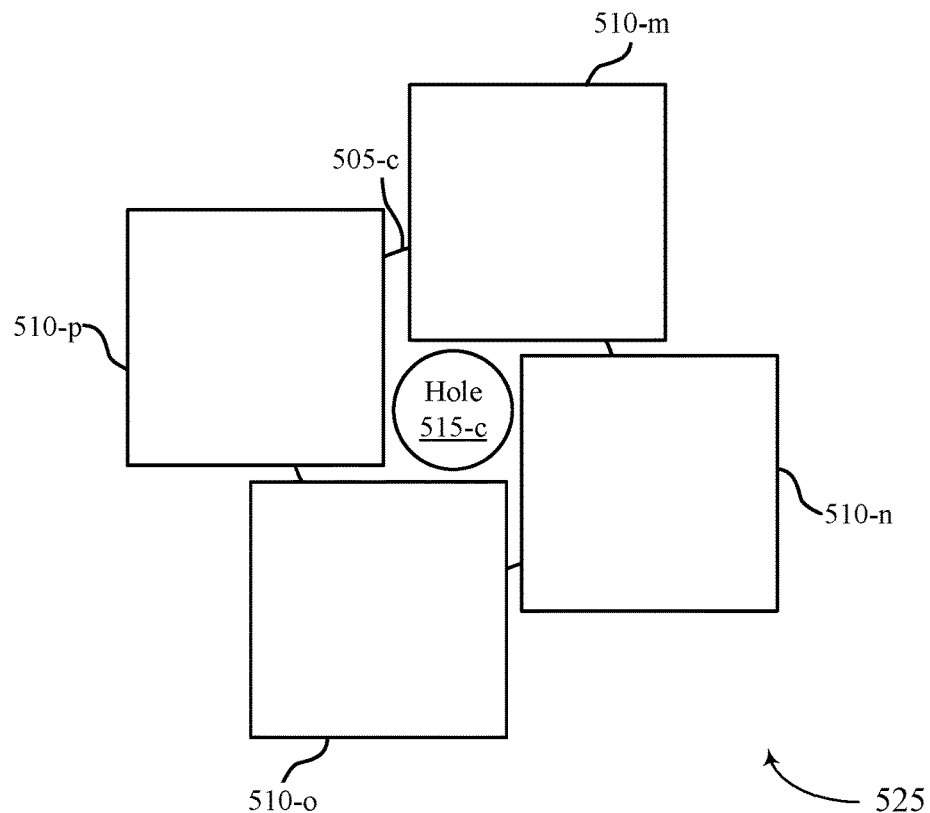

Referring to FIG. 5C, the photodetector panel configuration 525 may include a photodetector panel 505-c that includes a hole 515-c and a set of four photodetectors positioned around the hole 515-c. In some examples, the hole 515-c may be smaller in size (e.g., diameter) compared to the hole 515-a or 515-b. For example, the hole 515-c may have a diameter of 1 mm. In some examples, because the hole 515-c is smaller in size, a photodetector 510-m, a photodetector 510-n, a photodetector 510-o, and a photodetector 510-p of the set of photodetectors may be positioned to be off-center (e.g., off-center horizontally or vertically) with the hole 515-c. In some examples, the photodetectors 510 may be 3 mm by 3 mm (e.g., photodetectors 510 larger than photodetectors 510 of the photodetector panel configurations 500 and 520), and, in some cases, the photodetectors 510 may be SiPMs. The photodetector panel configuration 525 may be used by a UE 115 to position the photodetectors 510 closer to an optical axis of an OFE, which may support an increased optical gain (e.g., optical condensing gain, electronical combination gain) of received optical wireless signals compared to the photodetector panel configuration 500.

In some examples, the UE 115 may perform equal gain combination to combine the measurements (e.g., outputs) from each of the photodetectors 510 of the photodetector panel 505-c. For example, the photodetectors 510 be positioned on the photodetector panel 505-c such that each photodetector 510 may output a similar electrical signal to enable the UE 115 to perform equal gain combination for signals output by the photodetector 510-m, the photodetector 510-n, the photodetector 510-0, and the photodetector 510-p using a single (e.g., same) RF chain. As such, an OFE that includes the photodetector panel 505-c may include a reduced quantity of RF chains relative to if each photodetector 510 was associated with a respective RF chain. In some examples, each photodetector 510 may be associated with a respective RF chain, and equal gain combination may not be performed in receiving an optical wireless signal.

Figure 5D:
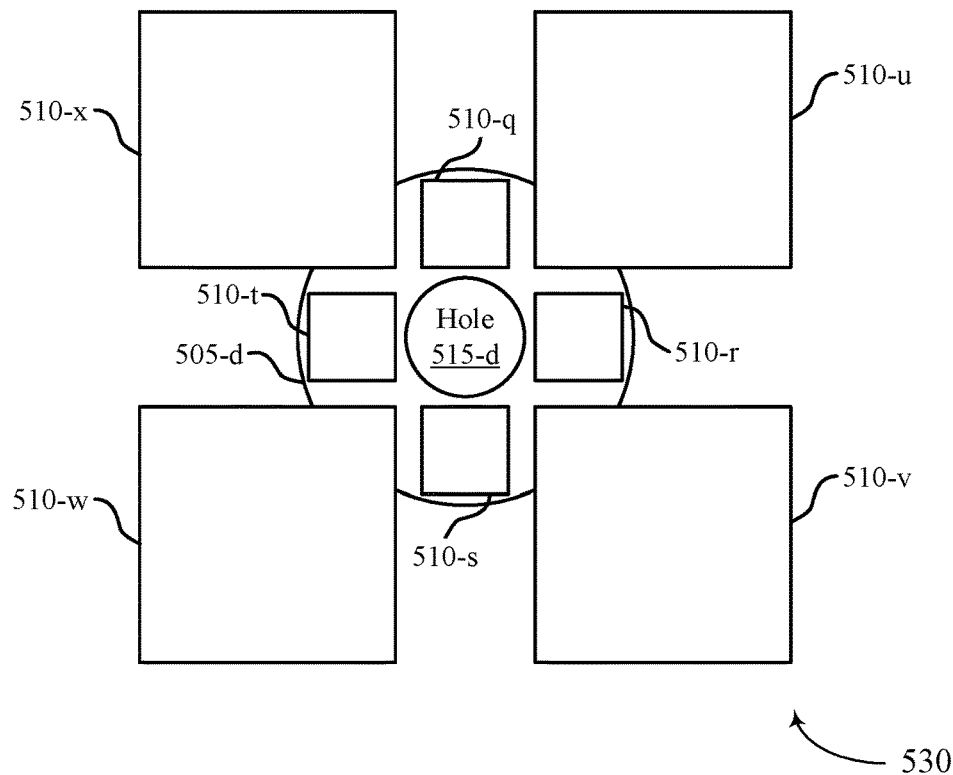

Referring to FIG. 5D, the photodetector panel configuration 530 may include a photodetector panel 505-d that includes a hole 515-d, a first set of a first set of photodetectors 510, which may be associated with a first RF chain, and a second set of photodetectors 510, which may be associated with a second RF chain. In some cases, the hole 515-d may be smaller than the hole 515-a or 515-b (e.g., may be the same size as the hole 515-c). For example, the hole 515-d may have a diameter of 1 mm. In some examples, the photodetectors 510 may be SiPMs, and photodetectors 510 of the first set may be smaller in size compared to the photodetectors 510 of the second set. For example, the first set of photodetectors 510 may each have dimensions of 1 mm by 1 mm, and the second set of photodetectors 510 may each have dimensions of 3 mm by 3 mm. The smaller sized photodetectors 510 of the first set may have better frequency response compared to the photodetectors 510 of the second set. The first set of photodetectors may include a photodetector 510-q, a photodetector 510-r, a photodetector 510-s, and a photodetector 510-t (e.g., photodetectors 510 aligned vertically and horizontally with respect to the hole 515-d). The second set of photodetectors may include a photodetector 510-u, a photodetector 510-v, a photodetector 510-w, and a photodetector 510-x (e.g., photodetectors aligned diagonally with respect to the hole 515-d).

The UE 115 may perform equal gain combination for each of the first set of photodetectors 510 and the second set of photodetectors 510 using the first RF chain and the second RF chain, respectively. For example, the UE 115 may receive one or more optical wireless signals using the first set of photodetectors 510 and the second set of photodetectors 510. The first set of photodetectors 510 may be positioned on the photodetector panel 505-d such that each photodetector 510 may output a similar electrical signal with respect to other photodetectors 510 of the first set. Additionally, the second set of photodetectors may be positioned on the photodetector panel 505-d such that each photodetector 510 may output a similar electrical signal with respect to other photodetectors 510 of the second set. Accordingly, the UE 115 may perform a first equal gain combination operation on a first set of signals output by the first set of photodetectors 510 and may perform a second equal gain combination operation on a second set of signals output by the second set of photodetectors 510. Two RF chains may be sufficient for the UE 115 to process the output of the first and second equal gain combinations, which may reduce a quantity of RF chains associated with an OFE that includes the photodetector panel 505-b relative to if each photodetector 510 was associated with a respective RF chain. In some examples, each photodetector 510 may be associated with a respective RF chain, and equal gain combination may not be performed in receiving an optical wireless signal.

Figure 6:
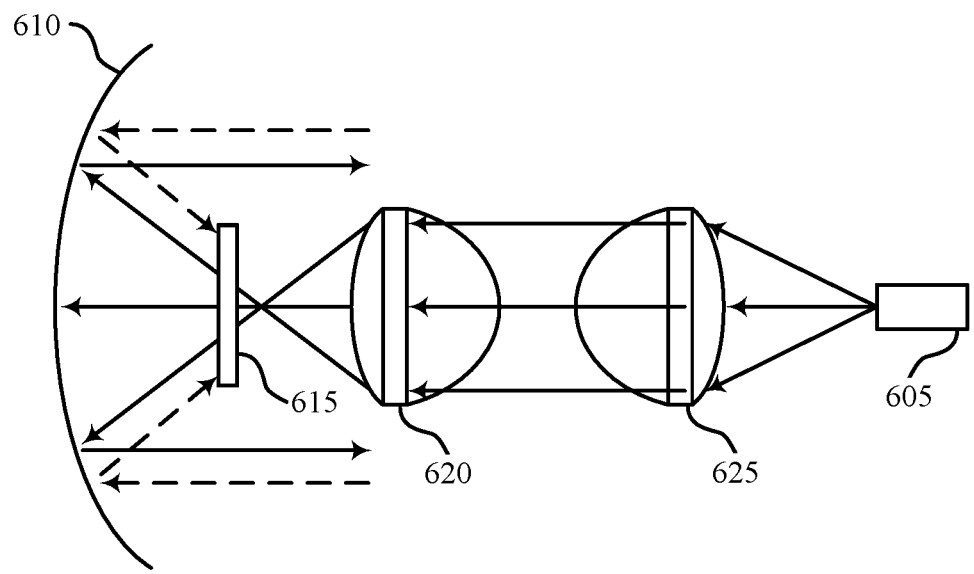
FIG. 6 shows an example of an OFE that supports a coaxial OFE for OWC in accordance with one or more aspects of the present disclosure.

FIG. 6 shows an example of an OFE 600 that supports a coaxial OFE for OWC in accordance with one or more aspects of the present disclosure. In some examples, aspects of the OFE 600 may implement or be implemented by aspects of the wireless communications system 100 and/or the wireless communications system 200. For example, the OFE 600 may be included in or implemented by a UE 115 and/or a network entity 105, which may be examples of the corresponding devices as described herein, including with reference to FIGS. 1, 2, and 5A through 5D.

In some examples, rather than using a common lens (e.g., a lens 310 or a lens 410 as described herein with reference to FIGS. 3 and 4, respectively) for beam steering of both receive and transmit beams of optical wireless signals, the OFE 600 may include a mirror 610 (e.g., a reflector). The mirror 610 may reflect light of an optical wireless signal (e.g., a downlink optical wireless signal for a network entity 105) such that light beams that impact the mirror 610 may be directed toward photodetectors of a photodetector panel 615 (e.g., a photodetector panel 315, 415, or 505), and a UE 115 may receive the optical wireless signal using the photodetectors.

A light source 605 may be positioned at a greater distance from the mirror 610 compared to the photodetector panel 615. Accordingly, the light source 605 may transmit an optical wireless signal (e.g., an uplink optical wireless signal) and light of the optical wireless signal may pass through a hole in the photodetector panel 615 to reach the mirror 610. The mirror 610 may reflect and collimate the light, and the optical wireless signal may be received at a network entity 105. In some examples, the OFE 600 may include a relay sub-system of lenses, as described with reference to FIG. 4. For example, the OFE 600 may include a lens 620 and a lens 625 via which the light source 605 may transmit the optical wireless signal to the mirror 610 and through the hole in the photodetector panel 615. In other examples, the OFE 600 may include the light source 605, the photodetector panel 615, and the mirror 610 without the optical relay sub-system (e.g., without the lens 620 and the lens 625).

In some examples, the mirror 610 may support a larger aperture (e.g., a larger diameter) compared to a lens (e.g., the lens 410). For example, the mirror 610 of the OFE 600 may have a larger diameter (e.g., aperture) compared with the lens 310 or the lens 410 as described herein with reference to FIGS. 3 and 4, respectively. Because the mirror 610 may have a larger aperture, the mirror 610 may direct a larger amount of light power from downlink optical wireless signals toward the photodetectors of the photodetector panel 615, which may improve an optical gain of optical wireless signals that the UE 115 may receive at the photodetector panel 615. Similarly, the mirror 610 may direct a larger amount of light power from uplink optical wireless signals transmitted by the light source 605 toward a network entity 105 that may receive the uplink optical wireless signal, which may improve an optical gain for optical wireless signals that the UE 115 transmits.

Figure 7:
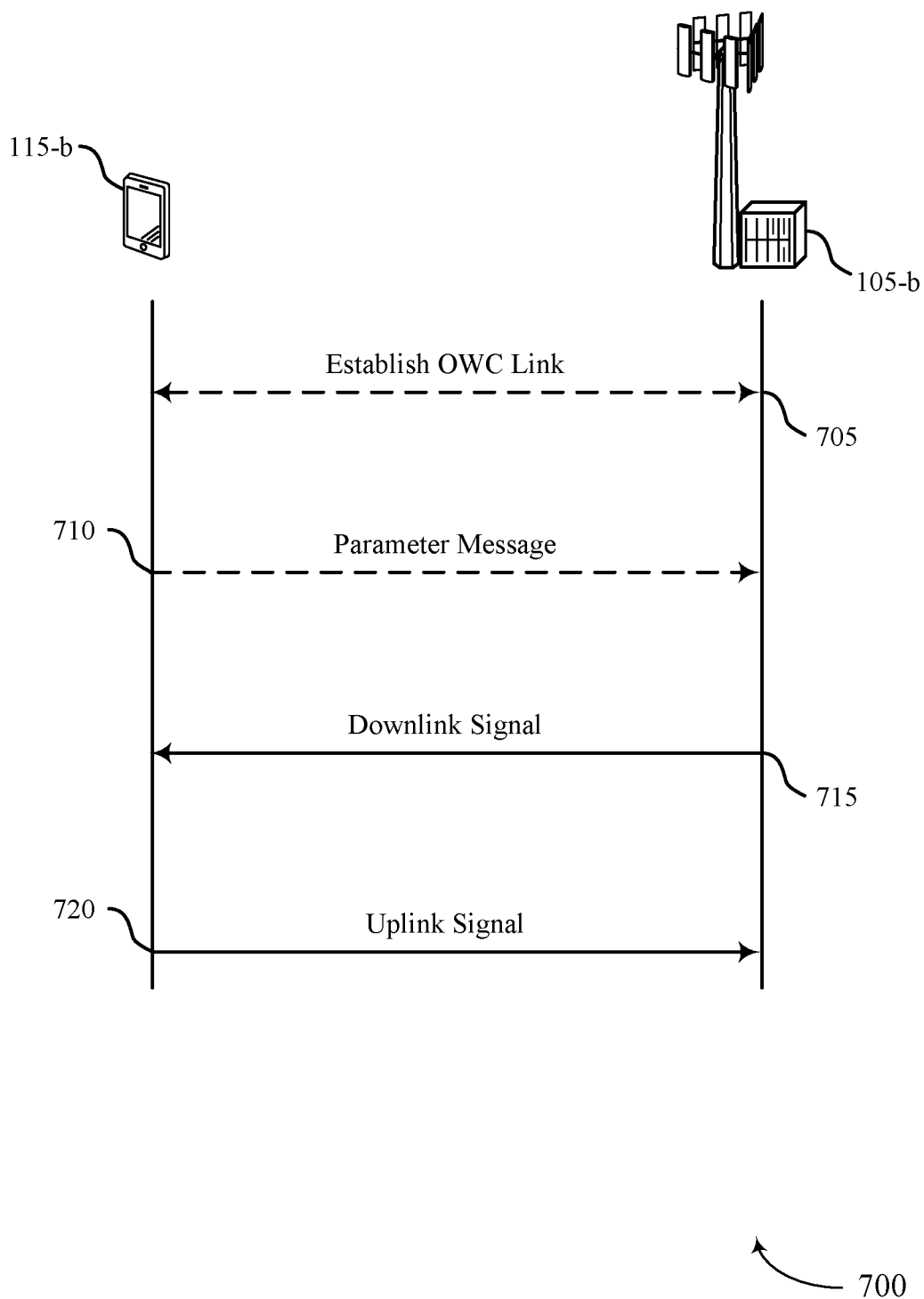
FIG. 7 shows an example of a process flow that supports a coaxial OFE for OWC in accordance with one or more aspects of the present disclosure.

FIG. 7 shows an example of a process flow 700 that supports a coaxial OFE for OWC in accordance with one or more aspects of the present disclosure. In some examples, aspects of the process flow 700 may implement or be implemented by aspects of the wireless communications system 100 and/or the wireless communications system 200. For example, the process flow 700 may be implemented by a UE 115-*b* and a network entity 105-*b*, which may be examples of the corresponding devices as described herein with reference to FIGS. 1 and 2. In the following description of the process flow 700, the operations between the network entity 105-*b* and the UE 115-*b* may be performed in a different order than the example order shown. Some operations may also be omitted from the process flow 700, and other operations may be added to the process flow 700. Further, although some operations or signaling may be shown to occur at different times for discussion purposes, these operations may actually occur at the same time.

At 705, the UE 115-*b* may establish an optical wireless communication link with the network entity 105-*b*. For example, the UE 115-*b* may establish the optical wireless communication link with the network entity 105-*b* using one or more optical communication components of the UE 115-*b* and one or more optical devices (e.g., lenses, mirrors, reflectors) of the UE 115-*b*. The optical communication components may be, for example, a photodetector, a photodetector panel, a light source, or any combination thereof.

At 710, the UE 115-*b* may transmit a parameter message to the network entity 105-*b* indicating one or more parameters associated with an OFE of the UE 115-*b*. In some examples, the parameter message may indicate that the UE 115-*b* supports (e.g., includes) a coaxial OFE for reception and transmission of optical wireless signals. In some examples, the parameter message may indicate one or more parameters of the coaxial OFE. For example, the parameter message may indicate a first distance between a curved optical device (e.g., lens, mirror, reflector) and a photodetector panel (e.g., receive PCB) that receives one or more optical wireless signals via the curved optical device. Additionally, or alternatively, the parameter message may indicate a second distance between the curved optical device and a light source that transmits one or more optical wireless signals via the curved optical device. In some examples, if the UE 115-*b* implements an optical relay sub-system to support transmitting optical wireless signals, the parameter message may indicate one or more parameters associated with the lenses of the optical relay sub-system (e.g., respective distances from the curved optical device). In some cases, the UE 115-*b* may have a capability to modify the one or more of the distances (e.g., first and second distances), such as via one or more translation stages coupled with the curved optical device, the photodetector panel, the light source, and/or, and may indicate the capability to modify the distances to the network entity 105-*b* (e.g., via the parameter message).

In some cases, the UE 115-*b* may perform measurements (e.g., calculations) to determine one or more of the distances with respect to an optical gain for receiving optical wireless signals (e.g., receive optical gain), an optical gain for transmitting optical wireless signals (e.g., transmit optical gain), or any combination thereof. The UE 115-*b* may adjust the first distance and the second distance to maximize one of the receive optical gain or the transmit optical gain, or the UE 115-*b* may adjust the first and second distances to balance both the receive optical gain and the transmit optical gain (e.g., according to some ratio of receive optical gain and transmit optical gain or according to one or more threshold values). In some examples, the parameter message may include the measurements performed by the UE 115-*b*.

At 715, the UE 115-*b* may receive, from the network entity 105-*b* via the optical wireless communication link, a first optical wireless signal (e.g., downlink signal) using one or more photodetectors positioned on a photodetector panel of the UE 115-*b*. The photodetector panel may include a hole around which the one or more photodetectors are positioned, and the photodetector panel may be located the first distance from the curved optical device of the UE 115-*b* via which the first optical wireless signal is received.

At 720, the transmit, to the network entity 105-*b* via the optical wireless communication link, a second optical wireless signal (e.g., uplink signal) using a light source of the UE 115-*b* that is located the second distance from the curved optical device via which the second optical wireless signal is transmitted. The second optical wireless signal may pass through the hole in the photodetector panel based on the second distance being greater than the first distance.

In some examples, the UE 115-*b* may transmit the second optical wireless signal via a first lens a third distance from the curved optical device and a second lens a fourth distance from the curved optical device (e.g., lenses included in an optical relay sub-system between the light source and the photodetector panel). The first lens may collimate the second optical wireless signal from the light source to the second lens and the second lens may condense the second optical wireless signal through the hole of the photodetector panel. The third distance may be less than the second distance and greater than the fourth distance, and the fourth distance may be greater than the first distance. A fifth distance between the light source and the first lens may correspond to a first focal length of the first lens. In some examples, the first focal length of the first lens may be the same as a second focal length of the second lens. In some examples, a first ratio of the first focal length to a first diameter of an aperture of the first lens may be the same as a second ratio of a third focal length of the curved optical device to a second diameter of an aperture of the curved optical device.

Figure 8:
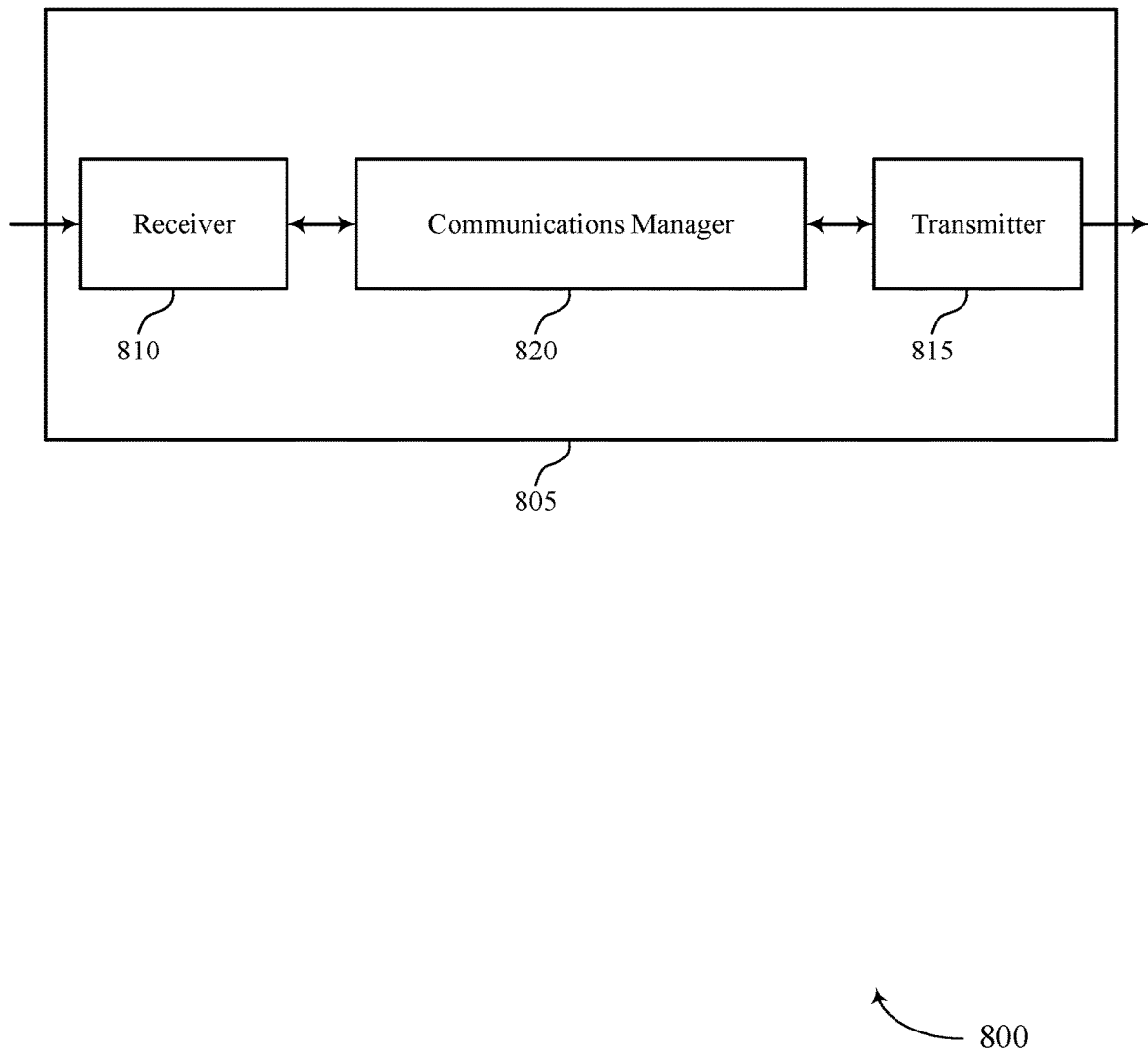
FIGS. 8 and 9 show block diagrams of devices that support a coaxial OFE for OWC in accordance with one or more aspects of the present disclosure.

FIG. 8 shows a block diagram 800 of a device 805 that supports a coaxial OFE for OWC in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor (not shown), which may be coupled with at least one memory, to, individually or collectively, support or enable the described techniques.

Each of these components may be in communication with one another (e.g., via one or more buses).

The receiver 810 may provide a means for receiving information such as packets, user data, control information, or any combination thereof associated with various information channels (e.g., control channels, data channels, information channels related to a coaxial OFE for OWC). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a coaxial OFE for OWC). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of a coaxial OFE for OWC as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support OWC at a UE in accordance with examples as disclosed herein. For example, the communications manager 820 is capable of, configured to, or operable to support a means for receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The communications manager 820 is capable of, configured to, or operable to support a means for transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

By including or configuring the communications manager 820 in accordance with examples as described herein, the device 805 (e.g., at least one processor controlling or otherwise coupled with the receiver 810, the transmitter 815, the communications manager 820, or any combination thereof) may support techniques for reduced power consumption by increasing efficiency of optical wireless signals. For example, the device 805 may support improved beam steering of optical wireless signals which may collect or direct a greater amount of power of the optical wireless signals received or transmitted by the UE or the network entity, enabling the UE or the network entity to reduce power or reduce processing associated with receiving or transmitting optical wireless signals with less waste.

Figure 9:
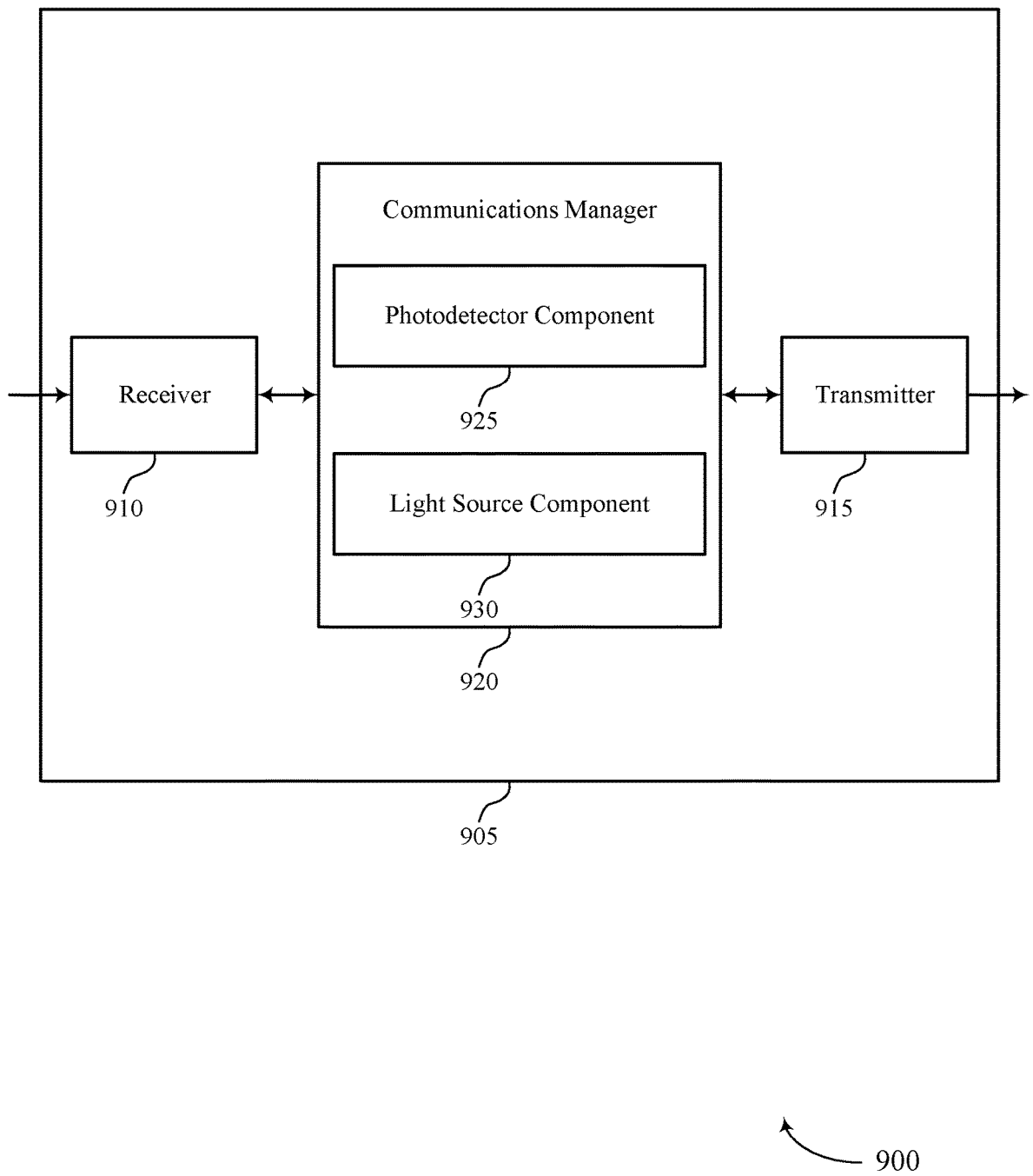

FIG. 9 shows a block diagram 900 of a device 905 that supports a coaxial OFE for OWC in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor (not shown), which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to a coaxial OFE for OWC). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a coaxial OFE for OWC). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of a coaxial OFE for OWC as described herein. For example, the communications manager 920 may include a photodetector component 925 a light source component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support OWC at a UE in accordance with examples as disclosed herein. The photodetector component 925 is capable of, configured to, or operable to support a means for receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The light source component 930 is capable of, configured to, or operable to support a means for transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

Figure 10:
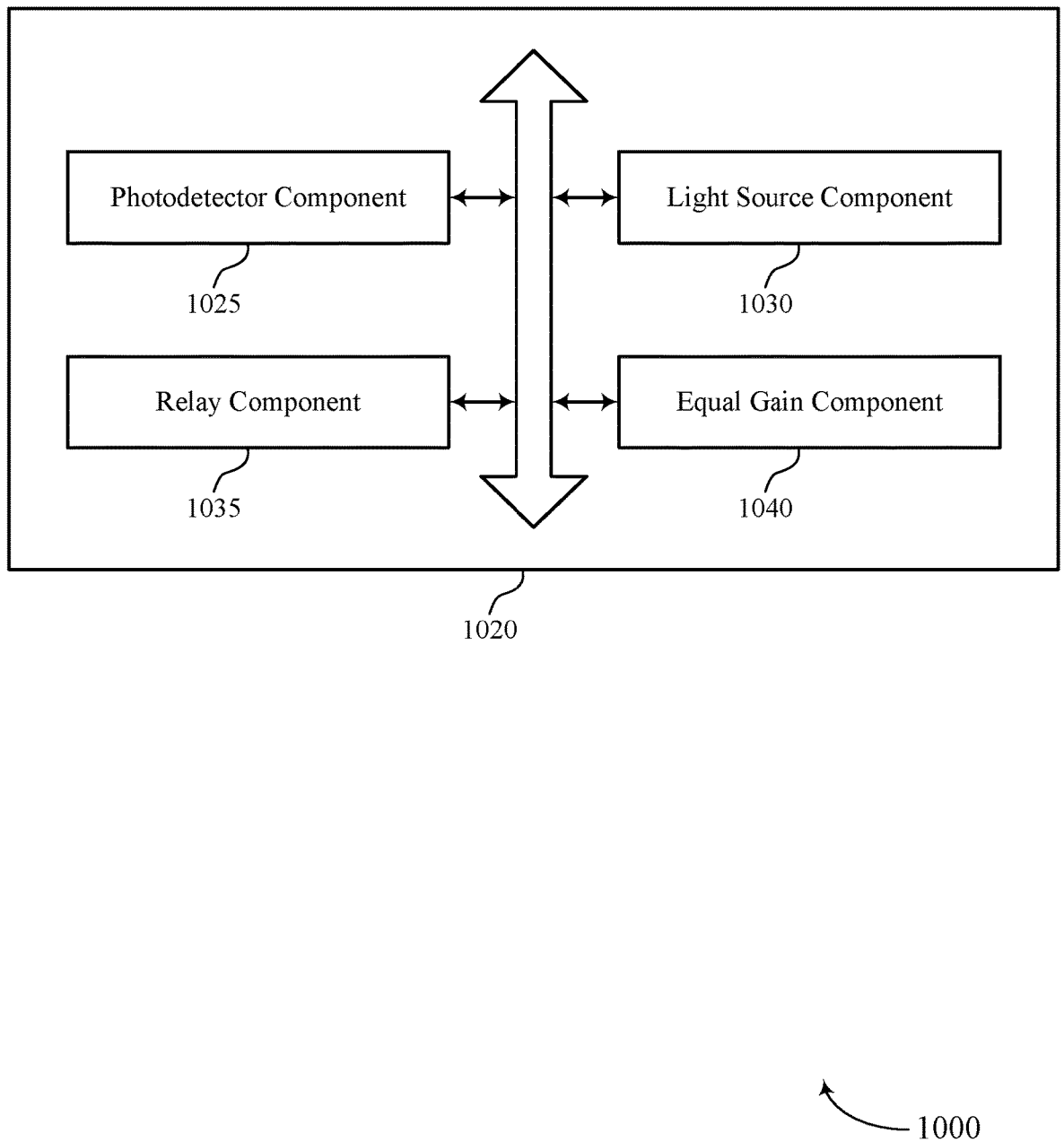
FIG. 10 shows a block diagram of a communications manager that supports a coaxial OFE for OWC in accordance with one or more aspects of the present disclosure.

FIG. 10 shows a block diagram 1000 of a communications manager 1020 that supports a coaxial OFE for OWC in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of a coaxial OFE for OWC as described herein. For example, the communications manager 1020 may include a photodetector component 1025, a light source component 1030, a relay component 1035, an equal gain component 1040, or any combination thereof. Each of these components, or components or subcomponents thereof (e.g., one or more processors, one or more memories), may communicate, directly or indirectly, with one another (e.g., via one or more buses).

The communications manager 1020 may support OWC at a UE in accordance with examples as disclosed herein. The photodetector component 1025 is capable of, configured to, or operable to support a means for receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The light source component 1030 is capable of, configured to, or operable to support a means for transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

In some examples, to support transmitting the second optical wireless signal, the relay component 1035 is capable of, configured to, or operable to support a means for transmitting the second optical wireless signal via a first lens a third distance from the curved optical device and a second lens a fourth distance from the curved optical device, where the first lens collimates the second optical wireless signal from the light source to the second lens and the second lens condenses the second optical wireless signal through the hole of the photodetector panel.

In some examples, the third distance is less than the second distance and greater than the fourth distance, and the fourth distance is greater than the first distance.

In some examples, a fifth distance between the light source and the first lens corresponds to a focal length of the first lens.

In some examples, a first ratio of focal length to aperture diameter of the first lens is the same as a second ratio of focal length to aperture diameter of the curved optical device.

In some examples, a first focal length of the first lens may be the same as a second focal length of the second lens. In some examples, the first focal length may be less than a third focal length of the curved optical device.

In some examples, to support receiving the first optical wireless signal, the photodetector component 1025 is capable of, configured to, or operable to support a means for receiving the first optical wireless signal using a set of multiple photodetectors of the one or more photodetectors. In some examples, to support receiving the first optical wireless signal, the equal gain component 1040 is capable of, configured to, or operable to support a means for performing an equal gain combination operation on a set of multiple signals output by the set of multiple photodetectors.

In some examples, the set of multiple photodetectors are associated with a same RF chain.

In some examples, to support receiving the first optical wireless signal, the photodetector component 1025 is capable of, configured to, or operable to support a means for receiving the first optical wireless signal using a first subset of photodetectors of the one or more photodetectors and a second subset of photodetectors of the one or more photodetectors. In some examples, to support receiving the first optical wireless signal, the equal gain component 1040 is capable of, configured to, or operable to support a means for performing a first equal gain combination operation on a first set of multiple signals output by the first subset of photodetectors. In some examples, to support receiving the first optical wireless signal, the equal gain component 1040 is capable of, configured to, or operable to support a means for performing a second equal gain combination operation on a second set of multiple signals output by the second subset of photodetectors.

In some examples, the first subset of photodetectors is associated with a first RF chain and the second subset of photodetectors is associated with a second RF chain.

In some examples, each photodetector of the first subset of photodetectors is a first size and each photodetector of the second subset of photodetectors is a second size, the second size being larger than the first size.

In some examples, the first distance is less than a focal length of the curved optical device.

In some examples, the one or more photodetectors includes a first set of photodetectors, the first set of photodetectors including two photodetectors aligned vertically with the hole and two photodetectors aligned horizontally with the hole.

In some examples, the curved optical device is a lens or a mirror.

Figure 11:
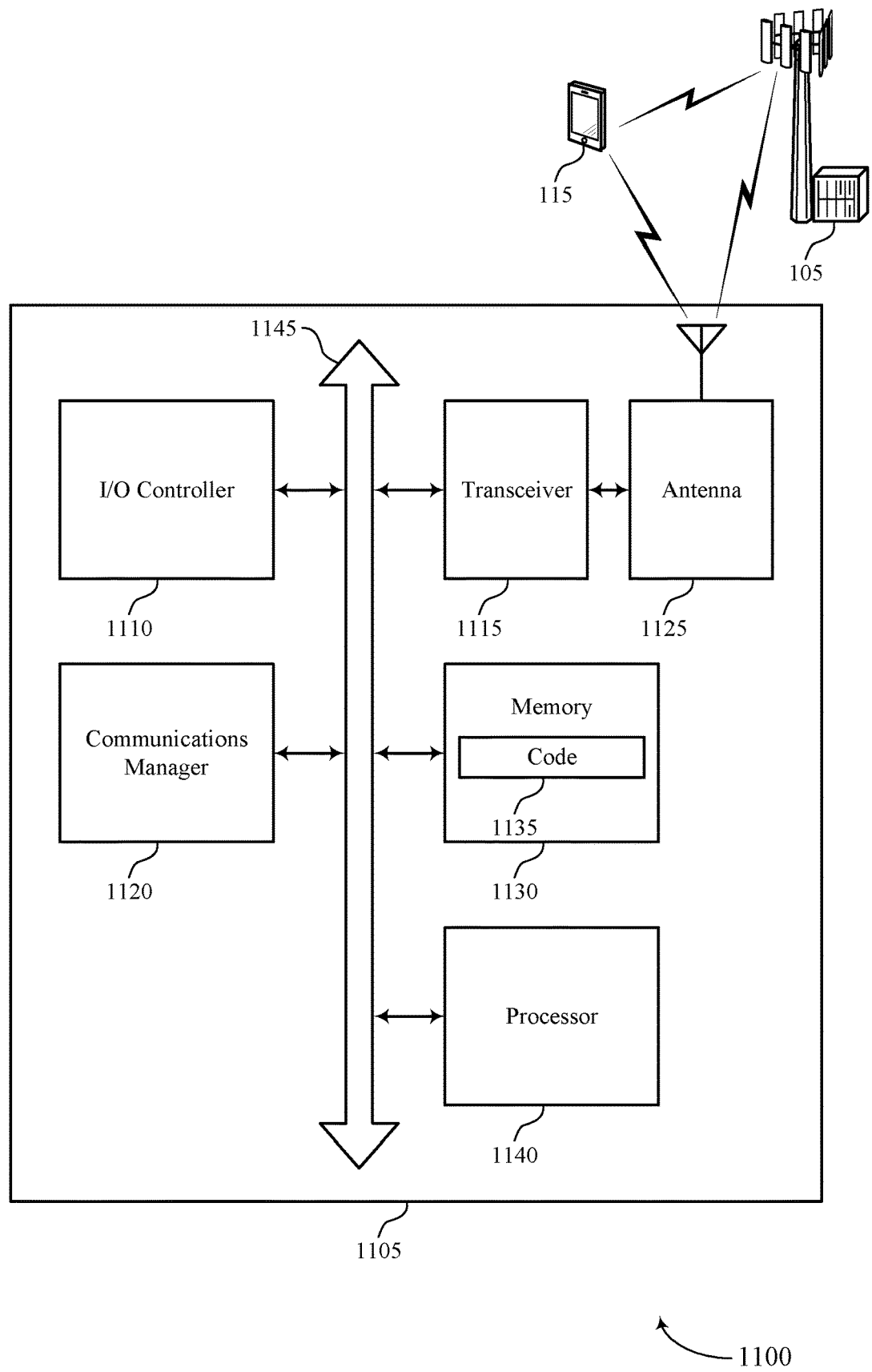
FIG. 11 shows a diagram of a system including a device that supports a coaxial OFE for OWC in accordance with one or more aspects of the present disclosure.

FIG. 11 shows a diagram of a system 1100 including a device 1105 that supports a coaxial OFE for OWC in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication with each other or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions (such as code 1135) stored in a memory (e.g., the at least one memory 1130) to cause the device 1105 to perform various functions (e.g., functions or tasks supporting a coaxial OFE for OWC). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein.

The communications manager 1120 may support OWC at a UE in accordance with examples as disclosed herein. For example, the communications manager 1120 is capable of, configured to, or operable to support a means for receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The communications manager 1120 is capable of, configured to, or operable to support a means for transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance.

By including or configuring the communications manager 1120 in accordance with examples as described herein, the device 1105 may support techniques for improved form factor and miniaturization of the device 1105. For example, by positioning components of an OFE on a same axis, the device 1105 may support a smaller lens tube or container for the OFE, which may improve form factor and support a reduced size of the device 1105. The device 1105 may also improve communication reliability by supporting beam steering in the downlink and uplink transmission directions, which may direct a greater amount of power to transmitters or receivers that communicate optical wireless signals, improving the accuracy and reliability of such signals.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of a coaxial OFE for OWC as described herein, or the at least one processor 1140 and the at least one memory 1130 may be otherwise configured to, individually or collectively, perform or support such operations.

Figure 12:
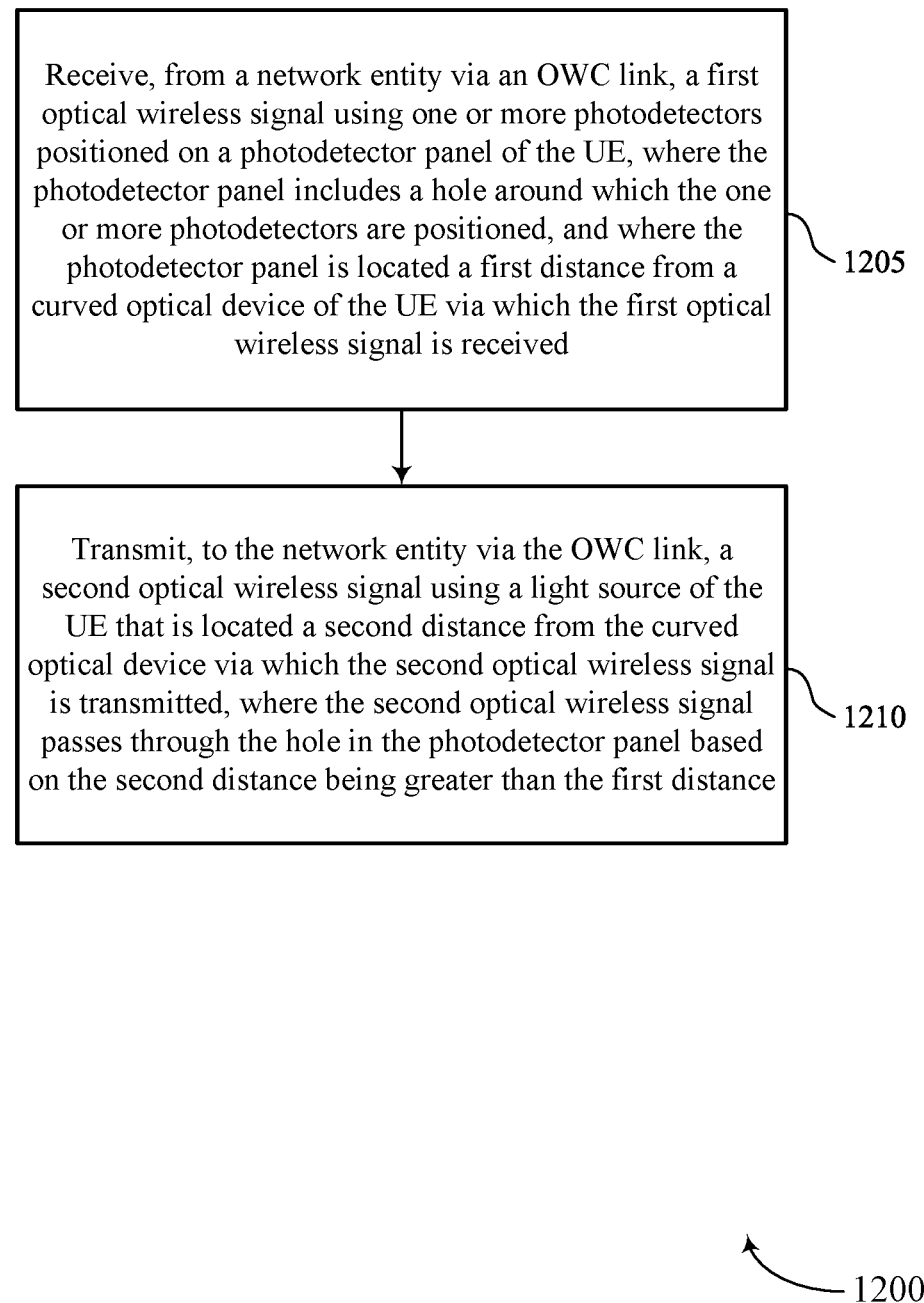
FIGS. 12 through 15 show flowcharts illustrating methods that support a coaxial OFE for OWC in accordance with one or more aspects of the present disclosure.

FIG. 12 shows a flowchart illustrating a method 1200 that supports a coaxial OFE for OWC in accordance with aspects of the present disclosure. The operations of the method 1200 may be implemented by a UE or its components as described herein. For example, the operations of the method 1200 may be performed by a UE 115 as described herein with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The operations of block 1205 may be performed in accordance with examples as disclosed herein. In some examples, aspects of the operations of 1205 may be performed by a photodetector component 1025 as described herein with reference to FIG. 10.

At 1210, the method may include transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance. The operations of block 1210 may be performed in accordance with examples as disclosed herein. In some examples, aspects of the operations of 1210 may be performed by a light source component 1030 as described herein with reference to FIG. 10.

Figure 13:
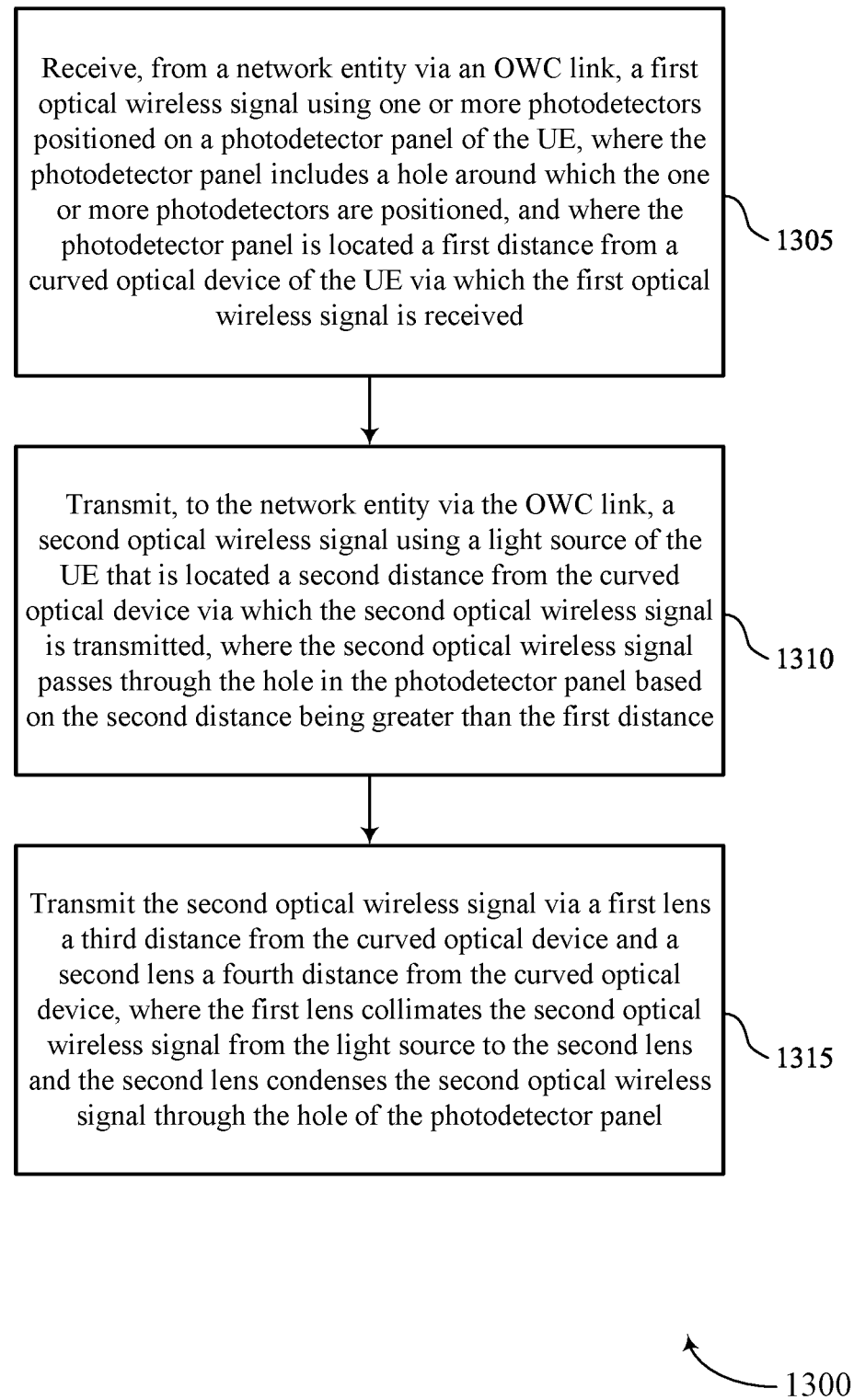

FIG. 13 shows a flowchart illustrating a method 1300 that supports a coaxial OFE for OWC in accordance with aspects of the present disclosure. The operations of the method 1300 may be implemented by a UE or its components as described herein. For example, the operations of the method 1300 may be performed by a UE 115 as described herein with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The operations of block 1305 may be performed in accordance with examples as disclosed herein. In some examples, aspects of the operations of 1305 may be performed by a photodetector component 1025 as described herein with reference to FIG. 10.

At 1310, the method may include transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance. The operations of block 1310 may be performed in accordance with examples as disclosed herein. In some examples, aspects of the operations of 1310 may be performed by a light source component 1030 as described herein with reference to FIG. 10.

At 1315, to support transmitting the second optical wireless signal, the method may include transmitting the second optical wireless signal via a first lens a third distance from the curved optical device and a second lens a fourth distance from the curved optical device, where the first lens collimates the second optical wireless signal from the light source to the second lens and the second lens condenses the second optical wireless signal through the hole of the photodetector panel. The operations of block 1315 may be performed in accordance with examples as disclosed herein. In some examples, aspects of the operations of 1315 may be performed by a relay component 1035 as described herein with reference to FIG. 10.

Figure 14:
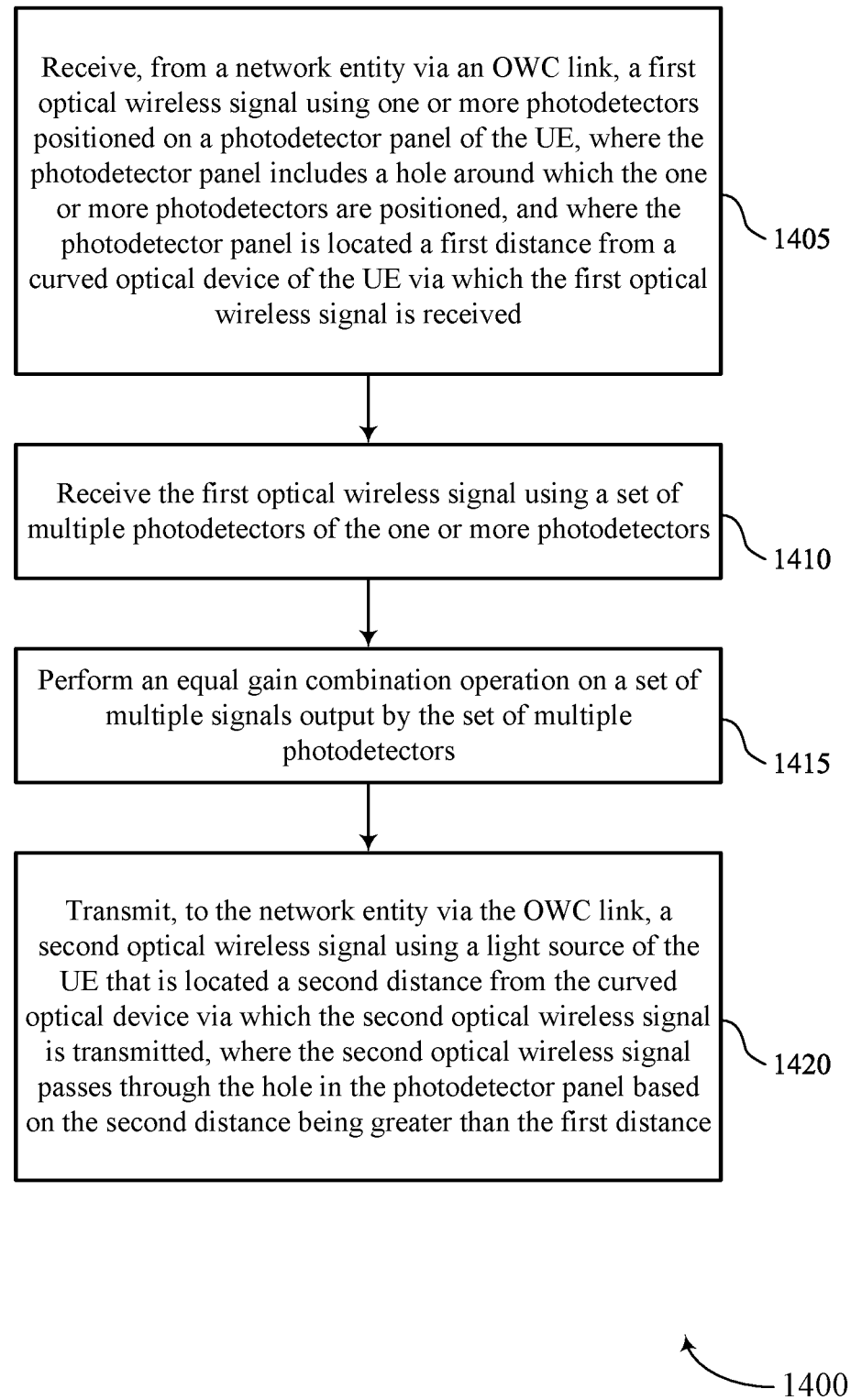

FIG. 14 shows a flowchart illustrating a method 1400 that supports a coaxial OFE for OWC in accordance with aspects of the present disclosure. The operations of the method 1400 may be implemented by a UE or its components as described herein. For example, the operations of the method 1400 may be performed by a UE 115 as described herein with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The operations of block 1405 may be performed in accordance with examples as disclosed herein. In some examples, aspects of the operations of 1405 may be performed by a photodetector component 1025 as described herein with reference to FIG. 10.

At 1410, to support receiving the first optical wireless signal, the method may include receiving the first optical wireless signal using a set of multiple photodetectors of the one or more photodetectors. The operations of block 1410 may be performed in accordance with examples as disclosed herein. In some examples, aspects of the operations of 1410 may be performed by a photodetector component 1025 as described herein with reference to FIG. 10.

At 1415, to support receiving the first optical wireless signal, the method may include performing an equal gain combination operation on a set of multiple signals output by the set of multiple photodetectors. The operations of block 1415 may be performed in accordance with examples as disclosed herein. In some examples, aspects of the operations of 1415 may be performed by an equal gain component 1040 as described herein with reference to FIG. 10.

At 1420, the method may include transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance. The operations of block 1420 may be performed in accordance with examples as disclosed herein. In some examples, aspects of the operations of 1420 may be performed by a light source component 1030 as described herein with reference to FIG. 10.

Figure 15:
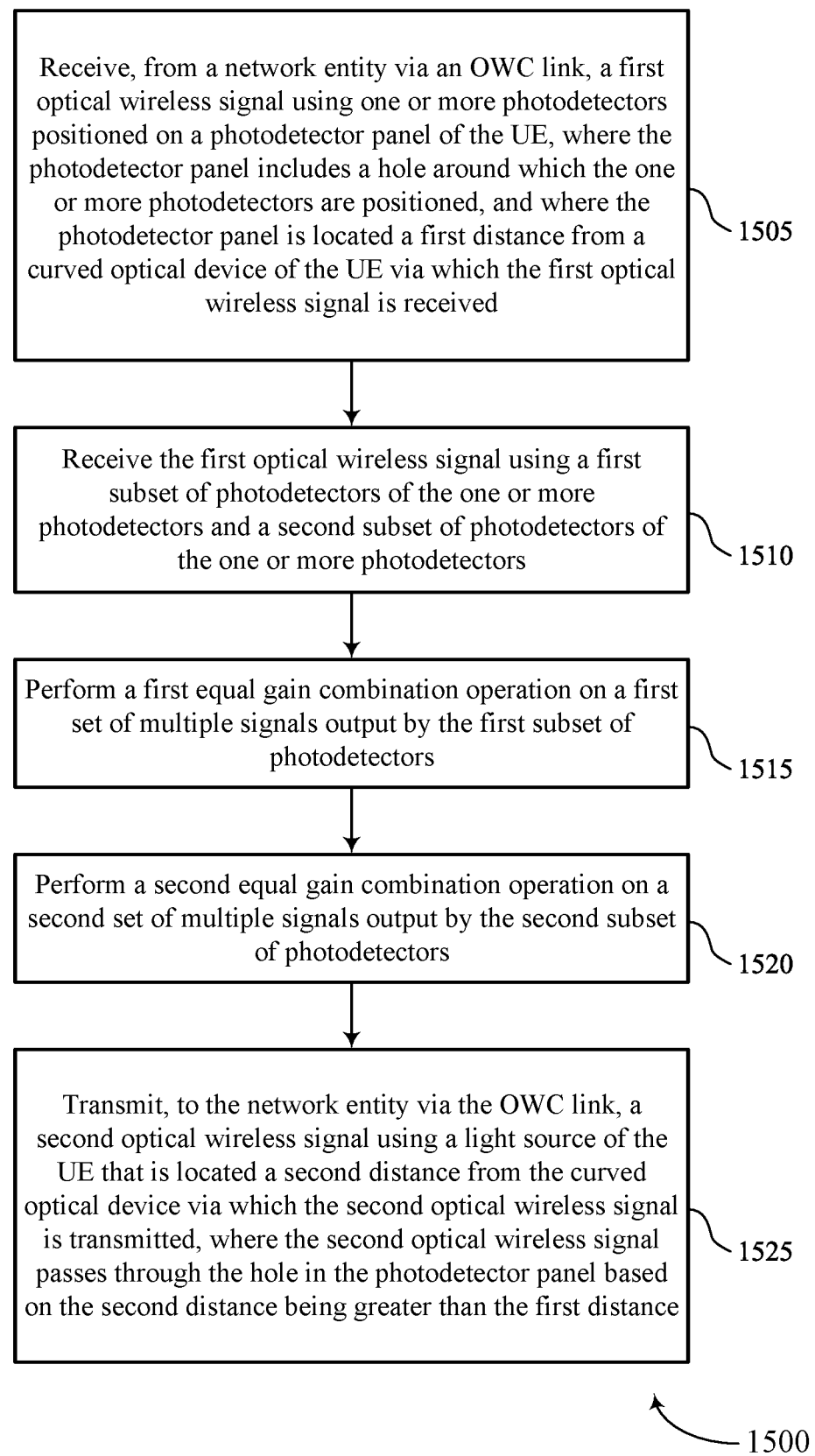

FIG. 15 shows a flowchart illustrating a method 1500 that supports a coaxial OFE for OWC in accordance with aspects of the present disclosure. The operations of the method 1500 may be implemented by a UE or its components as described herein. For example, the operations of the method 1500 may be performed by a UE 115 as described herein with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity via an OWC link, a first optical wireless signal using one or more photodetectors positioned on a photodetector panel of the UE, where the photodetector panel includes a hole around which the one or more photodetectors are positioned, and where the photodetector panel is located a first distance from a curved optical device of the UE via which the first optical wireless signal is received. The operations of block 1505 may be performed in accordance with examples as disclosed herein. In some examples, aspects of the operations of 1505 may be performed by a photodetector component 1025 as described herein with reference to FIG. 10.

At 1510, to support receiving the first optical wireless signal, the method may include receiving the first optical wireless signal using a first subset of photodetectors of the one or more photodetectors and a second subset of photodetectors of the one or more photodetectors. The operations of block 1510 may be performed in accordance with examples as disclosed herein. In some examples, aspects of the operations of 1510 may be performed by a photodetector component 1025 as described herein with reference to FIG. 10.

At 1515, to support receiving the first optical wireless signal, the method may include performing a first equal gain combination operation on a first set of multiple signals output by the first subset of photodetectors. The operations of block 1515 may be performed in accordance with examples as disclosed herein. In some examples, aspects of the operations of 1515 may be performed by an equal gain component 1040 as described herein with reference to FIG. 10.

At 1520, to support receiving the first optical wireless signal, the method may include performing a second equal gain combination operation on a second set of multiple signals output by the second subset of photodetectors. The operations of block 1520 may be performed in accordance with examples as disclosed herein. In some examples, aspects of the operations of 1520 may be performed by an equal gain component 1040 as described herein with reference to FIG. 10.

At 1525, the method may include transmitting, to the network entity via the OWC link, a second optical wireless signal using a light source of the UE that is located a second distance from the curved optical device via which the second optical wireless signal is transmitted, where the second optical wireless signal passes through the hole in the photodetector panel based on the second distance being greater than the first distance. The operations of block 1525 may be performed in accordance with examples as disclosed herein. In some examples, aspects of the operations of 1525 may be performed by a light source component 1030 as described herein with reference to FIG. 10.

The following provides an overview of aspects of the present disclosure:

Aspect 1: A method for OWC at a UE, comprising: receiving, from a network entity via an OWC link, a first optical wireless signal using one or more photodetectors positioned on a photodetector panel of the UE, wherein the photodetector panel comprises a hole around which the one or more photodetectors are positioned, and wherein the photodetector panel is located a first distance from a curved optical device of the UE via which the first optical wireless signal is received; and transmitting, to the network entity via the OWC link, a second optical wireless signal using a light source of the UE that is located a second distance from the curved optical device via which the second optical wireless signal is transmitted, wherein the second optical wireless signal passes through the hole in the photodetector panel based at least in part on the second distance being greater than the first distance.

Aspect 2: The method of aspect 1, wherein transmitting the second optical wireless signal comprises: transmitting the second optical wireless signal via a first lens a third distance from the curved optical device and a second lens a fourth distance from the curved optical device, wherein the first lens collimates the second optical wireless signal from the light source to the second lens and the second lens condenses the second optical wireless signal through the hole of the photodetector panel.

Aspect 3: The method of aspect 2, wherein the third distance is less than the second distance and greater than the fourth distance, and the fourth distance is greater than the first distance.

Aspect 4: The method of any of aspects 2 through 3, wherein a fifth distance between the light source and the first lens corresponds to a focal length of the first lens.

Aspect 5: The method of any of aspects 2 through 4, wherein a first ratio of focal length to aperture diameter of the first lens is the same as a second ratio of focal length to aperture diameter of the curved optical device.

Aspect 6: The method of any of aspects 2 through 5, wherein a first focal length of the first lens is the same as a second focal length of the second lens and less than a third focal length of the curved optical device.

Aspect 7: The method of any of aspects 1 through 6, wherein receiving the first optical wireless signal comprises: receiving the first optical wireless signal using a plurality of photodetectors of the one or more photodetectors; and performing an equal gain combination operation on a plurality of signals output by the plurality of photodetectors.

Aspect 8: The method of aspect 7, wherein the plurality of photodetectors are associated with a same RF chain.

Aspect 9: The method of any of aspects 1 through 8, wherein receiving the first optical wireless signal comprises: receiving the first optical wireless signal using a first subset of photodetectors of the one or more photodetectors and a second subset of photodetectors of the one or more photodetectors; performing a first equal gain combination operation on a first plurality of signals output by the first subset of photodetectors; and performing a second equal gain combination operation on a second plurality of signals output by the second subset of photodetectors.

Aspect 10: The method of aspect 9, wherein the first subset of photodetectors is associated with a first RF chain and the second subset of photodetectors is associated with a second RF chain.

Aspect 11: The method of any of aspects 1 through 10, wherein the first distance is less than a focal length of the curved optical device.

Aspect 12: The method of any of aspects 1 through 11, wherein the one or more photodetectors comprises a first set of photodetectors, the first set of photodetectors comprising two photodetectors aligned vertically with the hole and two photodetectors aligned horizontally with the hole.

Aspect 13: The method of any of aspects 1 through 12, wherein the curved optical device is a lens or a mirror.

Aspect 14: A UE for OWC, comprising one or more memories storing processor-executable code, and one or more processors coupled with the one or more memories and individually or collectively operable to execute the code to cause the UE to perform a method of any of aspects 1 through 13.

Aspect 15: A UE for OWC, comprising at least one means for performing a method of any of aspects 1 through 13.

Aspect 16: A non-transitory computer-readable medium storing code for OWC, the code comprising instructions executable by one or more processors to perform a method of any of aspects 1 through 13.

Aspect 17: A UE for OWC, including: a curved optical device; a photodetector panel located a first distance from the curved optical device, the photodetector panel including one or more photodetectors and a hole around which the one or more photodetectors are positioned; a light source located a second distance from the curved optical device; at least one processor; and at least one memory coupled with the at least one processor, with instructions stored in the at least one memory, the instructions being executable by the at least one processor, individually or in any combination, to cause the UE to: establish an OWC link with a network entity; and communicate, with the network entity via the OWC link, one or more optical wireless signals using at least one of the light source or the one or more photodetectors of the photodetector panel.

Aspect 18: The UE of aspect 17, where the instructions to communicate the one or more optical wireless signals are executable by the at least one processor, individually or in any combination, to cause the UE to: transmit, using the light source, the one or more optical wireless signals through the hole of the photodetector panel via the curved optical device based at least in part on the second distance being greater than the first distance.

Aspect 19: The UE of any of aspects 17 through 18, further including: a first lens a third distance from the curved optical device, where the third distance is less than the second distance and greater than the first distance; and a second lens a fourth distance from the curved optical device, where the fourth distance is greater than the first distance and less than the third distance.

Aspect 20: The UE of aspect 19, where the instructions to communicate the one or more optical wireless signals are executable by the at least one processor, individually or in any combination, to cause the UE to: transmit, using the light source, the one or more optical wireless signals via the first lens, the second lens, and the curved optical device, where the first lens collimates the one or more optical wireless signals from the light source to the second lens and the second lens condenses the one or more optical wireless signals through the hole of the photodetector panel and to the curved optical device.

Aspect 21: The UE of any of aspects 19 through 20, where a fifth distance between the light source and the first lens corresponds to a focal length of the first lens.

Aspect 22: The UE of any of aspects 19 through 21, where the curved optical device, the photodetector panel, the first lens, the second lens, and the light source are aligned on a same axis.

Aspect 23: The UE of any of aspects 19 through 22, where a first focal length of the first lens is the same as a second focal length of the second lens and less than a third focal length of the curved optical device.

Aspect 24: The UE of any of aspects 19 through 23, where a first ratio of focal length to aperture diameter of the first lens is the same as a second ratio of focal length to aperture diameter of the curved optical device.

Aspect 25: The UE of any of aspects 19 through 24, where a diameter of the curved optical device is greater than a diameter of the first lens and a diameter of the second lens.

Aspect 26: The UE of any of aspects 17 through 25, where the instructions to communicate the one or more optical wireless signals are executable by the at least one processor, individually or in any combination, to cause the UE to: receive the one or more optical wireless signals using a plurality of photodetectors of the one or more photodetectors; and perform an equal gain combination operation on a plurality of signals output by the plurality of photodetectors.

Aspect 27: The UE of aspect 26, where the plurality of photodetectors are associated with a same radio frequency chain.

Aspect 28: The UE of any of aspects 17 through 27, where the instructions to communicate the one or more optical wireless signals are executable by the at least one processor, individually or in any combination, to cause the UE to: receive the one or more optical wireless signals using a first subset of photodetectors of the one or more photodetectors and a second subset of photodetectors of the one or more photodetectors; perform a first equal gain combination operation on a first plurality of signals output by the first subset of photodetectors; and perform a second equal gain combination operation on a second plurality of signals output by the second subset of photodetectors.

Aspect 29: The UE of aspect 28, where the first subset of photodetectors are associated with a first radio frequency chain and the second subset of photodetectors are associated with a second radio frequency chain.

Aspect 30: The UE of any of aspects 28 through 29, where each photodetector of the first subset of photodetectors is a first size and each photodetector of the second subset of photodetectors is a second size, the second size being larger than the first size.

Aspect 31: The UE of any of aspects 17 through 30, where the first distance is less than a focal length of the curved optical device.

Aspect 32: The UE of any of aspects 17 through 31, where the one or more photodetectors includes a first set of photodetectors positioned on the photodetector panel, the first set of photodetectors including two photodetectors aligned vertically with the hole and two photodetectors aligned horizontally with the hole.

Aspect 33: The UE of any of aspects 17 through 32, where the curved optical device is a lens or a mirror.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of its functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for optical wireless communication by a user equipment (UE), comprising:
    receiving, from a network entity via an optical wireless communication link, a first optical wireless signal using one or more photodetectors positioned on a photodetector panel of the UE, wherein the photodetector panel comprises a hole around which the one or more photodetectors are positioned, and wherein the photodetector panel is located a first distance from a curved optical device of the UE via which the first optical wireless signal is received; and
    transmitting, to the network entity via the optical wireless communication link, a second optical wireless signal using a light source of the UE that is located a second distance from the curved optical device via which the second optical wireless signal is transmitted, wherein the second optical wireless signal passes through the hole in the photodetector panel based at least in part on the second distance being greater than the first distance.

2. The method of claim 1, wherein transmitting the second optical wireless signal comprises:
    transmitting the second optical wireless signal via a first lens a third distance from the curved optical device and a second lens a fourth distance from the curved optical device, wherein the first lens collimates the second optical wireless signal from the light source to the second lens and the second lens condenses the second optical wireless signal through the hole of the photodetector panel.

3. The method of claim 2, wherein:
    the third distance is less than the second distance and greater than the fourth distance, and
    the fourth distance is greater than the first distance.

4. The method of claim 2, wherein a fifth distance between the light source and the first lens corresponds to a focal length of the first lens.

5. The method of claim 2, wherein a first ratio of focal length to aperture diameter of the first lens is the same as a second ratio of focal length to aperture diameter of the curved optical device.

6. The method of claim 1, wherein receiving the first optical wireless signal comprises:
    receiving the first optical wireless signal using a plurality of photodetectors of the one or more photodetectors; and
    performing an equal gain combination operation on a plurality of signals output by the plurality of photodetectors.

7. The method of claim 6, wherein the plurality of photodetectors are associated with a same radio frequency chain.

8. The method of claim 1, wherein receiving the first optical wireless signal comprises:
    receiving the first optical wireless signal using a first subset of photodetectors of the one or more photodetectors and a second subset of photodetectors of the one or more photodetectors;
    performing a first equal gain combination operation on a first plurality of signals output by the first subset of photodetectors; and
    performing a second equal gain combination operation on a second plurality of signals output by the second subset of photodetectors.

9. The method of claim 8, wherein the first subset of photodetectors is associated with a first radio frequency chain and the second subset of photodetectors is associated with a second radio frequency chain.

10. The method of claim 1, wherein the first distance is less than a focal length of the curved optical device.

11. The method of claim 1, wherein the one or more photodetectors comprises a first set of photodetectors, the first set of photodetectors comprising two photodetectors aligned vertically with the hole and two photodetectors aligned horizontally with the hole.

12. The method of claim 1, wherein the curved optical device is a lens or a mirror.

13. A user equipment (UE) for optical wireless communication, comprising:
    a curved optical device;
    a photodetector panel located a first distance from the curved optical device, the photodetector panel comprising one or more photodetectors and a hole around which the one or more photodetectors are positioned;
    a light source located a second distance from the curved optical device;
    at least one processor; and at least one memory coupled with the at least one processor, with instructions stored in the at least one memory, the instructions being executable by the at least one processor, individually or in any combination, to cause the UE to:
- establish an optical wireless communication link with a network entity; and
- communicate, with the network entity via the optical wireless communication link, one or more optical wireless signals using at least one of the light source or the one or more photodetectors of the photodetector panel.

14. The UE of claim 13, wherein the instructions to communicate the one or more optical wireless signals are executable by the at least one processor, individually or in any combination, to cause the UE to:
- transmit, using the light source, the one or more optical wireless signals through the hole of the photodetector panel via the curved optical device based at least in part on the second distance being greater than the first distance.

15. The UE of claim 13, further comprising:
- a first lens a third distance from the curved optical device, wherein the third distance is less than the second distance and greater than the first distance; and
- a second lens a fourth distance from the curved optical device, wherein the fourth distance is greater than the first distance and less than the third distance.

16. The UE of claim 15, wherein the instructions to communicate the one or more optical wireless signals are executable by the at least one processor, individually or in any combination, to cause the UE to:
- transmit, using the light source, the one or more optical wireless signals via the first lens, the second lens, and the curved optical device, wherein the first lens collimates the one or more optical wireless signals from the light source to the second lens and the second lens condenses the one or more optical wireless signals through the hole of the photodetector panel and to the curved optical device.

17. The UE of claim 15, wherein a fifth distance between the light source and the first lens corresponds to a focal length of the first lens.

18. The UE of claim 15, wherein the curved optical device, the photodetector panel, the first lens, the second lens, and the light source are aligned on a same axis.

19. The UE of claim 15, wherein a first ratio of focal length to aperture diameter of the first lens is the same as a second ratio of focal length to aperture diameter of the curved optical device.

20. The UE of claim 15, wherein a diameter of the curved optical device is greater than a diameter of the first lens and a diameter of the second lens.

21. The UE of claim 13, wherein the instructions to communicate the one or more optical wireless signals are executable by the at least one processor, individually or in any combination, to cause the UE to:
- receive the one or more optical wireless signals using a plurality of photodetectors of the one or more photodetectors; and
- performing an equal gain combination operation on a plurality of signals output by the plurality of photodetectors.

22. The UE of claim 21, wherein the plurality of photodetectors are associated with a same radio frequency chain.

23. The UE of claim 13, wherein the instructions to communicate the one or more optical wireless signals are executable by the at least one processor, individually or in any combination, to cause the UE to:
- receive the one or more optical wireless signals using a first subset of photodetectors of the one or more photodetectors and a second subset of photodetectors of the one or more photodetectors;
- performing a first equal gain combination operation on a first plurality of signals output by the first subset of photodetectors; and
- performing a second equal gain combination operation on a second plurality of signals output by the second subset of photodetectors.

24. The UE of claim 23, wherein the first subset of photodetectors is associated with a first radio frequency chain and the second subset of photodetectors is associated with a second radio frequency chain.

25. The UE of claim 23, wherein each photodetector of the first subset of photodetectors is a first size and each photodetector of the second subset of photodetectors is a second size, the second size being larger than the first size.

26. The UE of claim 13, wherein the first distance is less than a focal length of the curved optical device.

27. The UE of claim 13, wherein the one or more photodetectors comprises a first set of photodetectors positioned on the photodetector panel, the first set of photodetectors comprising two photodetectors aligned vertically with the hole and two photodetectors aligned horizontally with the hole.

28. The UE of claim 13, wherein the curved optical device is a lens or a mirror.

29. A user equipment (UE) for optical wireless communication, comprising:
- at least one processor; and
- at least one memory coupled with the at least one processor, with instructions stored in the at least one memory, the instructions being executable by the at least one processor, individually or in any combination, to cause the UE to:
  - receive, from a network entity via an optical wireless communication link, a first optical wireless signal using one or more photodetectors positioned on a photodetector panel of the UE, wherein the photodetector panel comprises a hole around which the one or more photodetectors are positioned, and wherein the photodetector panel is located a first distance from a curved optical device of the UE via which the first optical wireless signal is received; and
  - transmit, to the network entity via the optical wireless communication link, a second optical wireless signal using a light source of the UE that is located a second distance from the curved optical device via which the second optical wireless signal is transmitted, wherein the second optical wireless signal passes through the hole in the photodetector panel based at least in part on the second distance being greater than the first distance.

30. A user equipment (UE) for optical wireless communication, comprising:
- means for receiving, from a network entity via an optical wireless communication link, a first optical wireless signal using one or more photodetectors positioned on a photodetector panel of the UE, wherein the photodetector panel comprises a hole around which the one or more photodetectors are positioned, and wherein the photodetector panel is located a first distance from a curved optical device of the UE via which the first optical wireless signal is received; and means for transmitting, to the network entity via the optical wireless communication link, a second optical wireless signal using a light source of the UE that is located a second distance from the curved optical device via which the second optical wireless signal is transmitted, wherein the second optical wireless signal passes through the hole in the photodetector panel based at least in part on the second distance being greater than the first distance.

* * * * *